(12) United States Patent
Ratner

(10) Patent No.: US 8,998,128 B2
(45) Date of Patent: Apr. 7, 2015

(54) UMBRELLA VALVES TO INFLATE BLADDER IN BALLOON ENVELOPE

(71) Applicant: Google Inc., Mountain View, CA (US)

(72) Inventor: Daniel Ratner, San Francisco, CA (US)

(73) Assignee: Google Inc., Mountain View, CA (US)

(*) Notice: Subject to any disclaimer, the term of this patent is extended or adjusted under 35 U.S.C. 154(b) by 143 days.

(21) Appl. No.: 13/903,462

(22) Filed: May 28, 2013

(65) Prior Publication Data

US 2014/0353424 A1    Dec. 4, 2014

(51) Int. Cl.
*B64B 1/58* (2006.01)
*B64B 1/62* (2006.01)

(52) U.S. Cl.
CPC ........................................ *B64B 1/62* (2013.01)

(58) Field of Classification Search
USPC .................................... 244/31, 98, 33, 99, 96
See application file for complete search history.

(56) References Cited

U.S. PATENT DOCUMENTS

| | | | |
|---|---|---|---|
| 1,390,745 A | | 9/1921 | Armstrong |
| 2,492,800 A | * | 12/1949 | Isom ................................ 244/31 |
| 2,524,567 A | * | 10/1950 | Isom ................................ 244/24 |
| 2,790,479 A | | 4/1957 | Mastenbrook |
| 2,931,597 A | | 4/1960 | Moore, Jr. |
| 3,047,259 A | | 7/1962 | Tatnall et al. |
| 3,119,578 A | | 1/1964 | Borgeson et al. |
| 3,390,853 A | | 7/1968 | Wykes |
| 3,433,435 A | | 3/1969 | Alai |
| 3,452,949 A | | 7/1969 | Maloney et al. |
| 3,614,031 A | | 10/1971 | Demboski |
| 3,807,384 A | | 4/1974 | Schach et al. |
| 4,113,206 A | | 9/1978 | Wheeler |
| 4,174,082 A | | 11/1979 | Eshoo |
| 4,215,834 A | | 8/1980 | Dunlap |
| 4,262,864 A | | 4/1981 | Eshoo |
| 4,366,936 A | | 1/1983 | Ferguson |
| 4,651,956 A | | 3/1987 | Winker et al. |

(Continued)

FOREIGN PATENT DOCUMENTS

| | | |
|---|---|---|
| WO | 2011/160172 | 12/2011 |
| WO | 2012/012275 | 1/2012 |
| WO | 2012/025769 | 3/2012 |

OTHER PUBLICATIONS

International Searching Authority, International Search Report and Written Opinion for International Application No. PCT/US2014/038949, mailed Oct. 1, 2014, 10 pages.

(Continued)

*Primary Examiner* — Christopher P Ellis
(74) *Attorney, Agent, or Firm* — McDonnell Boehnen Hulbert & Berghoff LLP.

(57) ABSTRACT

A balloon having a bladder positioned within a balloon envelope, a plate having a port, a housing secured to the plate, an impeller positioned within the housing, the port providing a passageway from an inside of the housing to an inside of the bladder, wherein a passive valve having a periphery is positioned over the port, a control system configured, upon receiving a signal to increase the amount of air within the bladder, to cause the passive valve to move from a first, closed position where a seal is provided by the engagement of the periphery of the passive valve and a periphery of the port to a second, open position where the periphery of the passive valve is disengaged from the periphery of the port to open the passageway between the housing and the bladder and to allow air to be forced into the bladder.

25 Claims, 14 Drawing Sheets

(56) References Cited

U.S. PATENT DOCUMENTS

| | | | |
|---|---|---|---|
| 5,297,763 A * | 3/1994 | Cazort | 244/31 |
| 5,335,689 A | 8/1994 | Reittu | |
| 5,593,113 A | 1/1997 | Cox | |
| 5,645,248 A | 7/1997 | Campbell | |
| 6,119,979 A | 9/2000 | Lee et al. | |
| 6,324,398 B1 | 11/2001 | Lanzerotti et al. | |
| 6,540,178 B1 | 4/2003 | Hillsdon | |
| 6,607,166 B1 | 8/2003 | Pichkhadze et al. | |
| 6,628,941 B2 * | 9/2003 | Knoblach et al. | 455/431 |
| 6,648,272 B1 * | 11/2003 | Kothmann | 244/97 |
| 6,808,144 B1 | 10/2004 | Nicolai et al. | |
| 6,830,222 B1 | 12/2004 | Nock et al. | |
| 7,046,934 B2 | 5/2006 | Badesha et al. | |
| 7,341,223 B2 | 3/2008 | Chu | |
| 7,341,224 B1 | 3/2008 | Osann, Jr. | |
| 7,356,390 B2 | 4/2008 | Knoblach et al. | |
| 7,478,779 B2 * | 1/2009 | Nguyen et al. | 244/31 |
| 7,567,779 B2 | 7/2009 | Seligsohn et al. | |
| 7,568,656 B2 | 8/2009 | Handley | |
| 7,913,948 B2 | 3/2011 | Porter | |
| 7,948,426 B2 | 5/2011 | Pevler et al. | |
| 8,061,648 B2 | 11/2011 | Lachenmeier | |
| 8,167,236 B2 | 5/2012 | Jess | |
| 8,356,569 B2 | 1/2013 | Sjoblom | |
| 8,505,847 B2 * | 8/2013 | Ciampa et al. | 244/30 |
| 8,814,084 B2 * | 8/2014 | Shenhar | 244/97 |
| 2002/0167702 A1 | 11/2002 | Badesha et al. | |
| 2004/0065773 A1 | 4/2004 | Morales | |
| 2006/0000945 A1 | 1/2006 | Voss | |
| 2006/0065777 A1 * | 3/2006 | Walden et al. | 244/97 |
| 2007/0102570 A1 | 5/2007 | Luffman | |
| 2008/0272233 A1 | 11/2008 | Marlin | |
| 2008/0299990 A1 * | 12/2008 | Knoblach et al. | 455/456.1 |
| 2009/0294576 A1 | 12/2009 | LaForge | |
| 2010/0039984 A1 | 2/2010 | Brownrigg | |
| 2010/0147994 A1 | 6/2010 | Nguyen et al. | |
| 2012/0031119 A1 | 2/2012 | Ahmad et al. | |
| 2012/0081908 A1 | 4/2012 | Harms et al. | |

OTHER PUBLICATIONS

Horwath et al., "Broadband Backhaul Communication for Stratospheric Platforms: The Stratospheric Optical Payload Experiment (STROPEX)," Society of Photo-Optical Instrumentation Engineers (SPIE), 2006, vol. 6304 (12 pages).
Giggenbach et al., "Optical Free-Space Communications Downlinks from Stratospheric Platforms—Overview on STROPEX, the Optical Communications Experiment of CAPANINA," 14th IST Mobile & Wireless Communications Summit, Jun. 2005, No. 483, Dresden, Germany (4 pages).
Acampora et al., "A Broadband Wireless Access Network Based on Mesh-Connected Free-Space Optical Links," IEEE Personal Communications, Oct. 1999, 1070-9916/99, pp. 62-65.
Thornton et al., "Broadband communications from a high-altitude platform: the European HeliNet programme," Electronics & Communication Engineering Journal, Jun. 2001, pp. 138-144.
Akella et al., "Building Blocks for Mobile Free-Space-Optical Networks," IEEE, 2005, 0-7803-9019-9/05 (5 pages).
Grace, D. et al., "CAPANINA—Communications from Aerial Platform Networks Delivering Broadband Information for All," 14th IST Mobile & Wireless Communications Summit, Jun. 2005, No. 252, Dresden, Germany (5 pages).
Mohorcic et al., "Evaluation of Wavelength Requirements for Stratospheric Optical Transport Networks," Journal of Communications, Sep. 2009, vol. 4, No. 8, pp. 588-596.
Fortuna et al., "HAP based optical transport network design," Proceedings of the 15th International Electrotechnical and Computer Science Conference (ERK) Sep. 2006 (4 pages).
Aragon-Zavala et al., High-Altitude Platforms for Wireless Communications, John Wiley & Sons, Ltd., 2008, pp. C1-C80.
Aragon-Zavala et al., High-Altitude Platforms for Wireless Communications, John Wiley & Sons, Ltd., 2008, pp. 81-158.
Aragon-Zavala et al., High-Altitude Platforms for Wireless Communications, John Wiley & Sons, Ltd., 2008, pp. 159-241.
Biswas, A. et al., "Deep Space Optical Communications Link Availability and Data Volume," Free-Space Laser Communication Technologies XVI, San Jose, CA, Jan. 2004 (9 pages).
Giggenbach et al., "Optical Data Downlinks from Earth Observation Platforms," Proceedings of the SPIE, 2009, vol. 7199 (14 pages).
Grace et al., "Integrating Users into the Wider Broadband Network via High Altitude Platforms," IEEE Wireless Communications, 1536-1286/05, Oct. 2005, pp. 98-105.
Akella et al., "Multi-channel Communication in Free-Space Optical Networks for the Last-mile," available online at: http://networks.ecse.rpi.edu/~sri/papers/Array-lanman07.pdf (last visited Jan. 18, 2012).
Willner et al., "Physical Layer Routing in Free-Space Optical Networks, LEOS," available online at: http://photonicssociety.org/newsletters/oct05/physical_layer.html (last visited Jan. 18, 2012).
Mullins, Justin "NASA Develops 'Smart' Weather Balloons for Launch Sites," NewScientist, May 23, 2007.
Hutchinson, James, Mobile Mesh Network Finds Interest in NGOs, Australian Red Cross enthusiastic about options presented by mesh telephony, available online at: http://www.computerworld.com.au/article/374682/mobile_mesh_network_finds_interest_ngos/ (last visited Jan. 17, 2012).
Dung Dinh Luong, et al., Network Architecture and Protocols, CAPANINA, Oct. 16, 2006, pp. 1-83.
Dung Dinh Luong, et al., Network Architecture and Protocols, CAPANINA, Oct. 16, 2006, pp. 84-172.
In Keun Son, Design and Optimization of Free Space Optical Networks, Auburn University, Dec. 13, 2010, pp. 1-78, Auburn, Alabama.
In Keun Son, Design and Optimization of Free Space Optical Networks, Auburn University, Dec. 13, 2010, pp. 79-147, Auburn, Alabama.
Hui Zang, et al., A Review of Routing and Wavelength Assignment Approaches for Wavelength-Routed Optical WDM Networks, Optical Networks Magazine, Jan. 2000, pp. 47-60.
Bloom, et al., "The Last-Mile Solution: Hybrid FSO Radio," AirFiber, Inc., May 2002, pp. 1-20.
Di Wang, et al., "Throughput Capacity of Hybrid Radio-Frequency and Free-Space-Optical (RF/FSO) Multi-Hop Networks," Department of Electrical, Computer and Systems Engineering, Rensselaer Polytechnic Institute, pp. 1-8.
Smadi, et al., "Free-Space Optical Gateway Placement in Hybrid Wireless Mesh Networks," Journal of Lightwave Technology, Jul. 15, 2009, vol. 27, No. 14, pp. 2688-2697.
Eddleston, et al., Mesh Networking Soars to New Heights, available online at: http://www.airballooningevent.com/mesh-networking-soars-to-new-heights (last visited Jan. 18, 2012) (Feb. 19, 2005).
Walsh, Balloon Network Test Successful, available online at: http://17.taylor.edu/community/news/news_detail.shtml?inode=14221 (last visited Jan. 18, 2012) Nov. 5, 2007.
Tozer et al., High-altitude platforms for wireless communications, Electronics & Communication Engineering Journal, Jun. 2001, 127-137.
Ellinas, et al., Network Control and Management Challenges in Opaque Networks Utilizing Transparent Optical Switches, available online at: http://www.jaywalkertc.com/publications/JAW_live_papers/IEEE_Opt_Comm.pdf (last visited Jan. 18, 2012), pp. 1-19.
Ozdaglar, et al., Routing and Wavelength Assignment in Optical Networks, available online at: http://web.mit.edu/asuman/www/documents/RWA_Paper.pdf (last visited Jan. 18, 2012), pp. 1-25.
Grace et al., Broadband Communications via High Altitude Platforms, John Wiley & Sons, Ltd., 2011, pp. 49-73.
Grace et al., Broadband Communications via High Altitude Platforms, John Wiley & Sons, Ltd., 2011, pp. 75-113.
Grace et al., Broadband Communications via High Altitude Platforms, John Wiley & Sons, Ltd., 2011, pp. 219-238.
Balaram et al., "Autonomous Mobility, Navigation and Control for Venus Aerobots," International Symposium on Artificial Intelligence, Optics and Automation in Space, Jul. 14, 1997, Tokyo, Japan, pp. 1-7.

(56) References Cited

OTHER PUBLICATIONS

Carten Jr., Andrew S., An Investigation of the Applicability of High Altitude, Lighter-Than-Air (LTA) Vehicles to the Tactical Communications Relay Problem, Air Force Cambridge Research Labs, Hanscom Air Force Base, Aug. 20, 1974, Massachusetts, pp. 1-62.

Corbett et al., High Altitude Balloon Project, Wright State University, Engineering Design, Mar. 11, 2006, Dayton, Ohio, pp. 1-76.

International Search Report for PCT/US2013/020525 mailed Apr. 22, 2013, 16 pages.

* cited by examiner

UMBRELLA VALVES TO INFLATE BLADDER IN BALLOON ENVELOPE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, an apparatus is provided having a balloon envelope, a plate having a port, a housing secured to the plate, an impeller positioned within the housing, wherein the port provides a passageway from an inside of the housing to an inside of the balloon envelope, wherein a passive valve having a periphery is positioned over the port, wherein the passive valve is movable from a first, closed position where a seal is provided by the engagement of the periphery of the passive valve and a periphery of the port to a second, open position where the periphery of the passive valve is disengaged from the periphery of the port by the force of air moved toward the port by the impeller to open the passageway between the housing and the balloon envelope and allow air to be forced into the balloon envelope.

In another aspect, a balloon is provided having a balloon envelope, a bladder positioned within the balloon envelope, a plate having a port, a housing secured to the plate, and an impeller positioned within the housing, wherein the port provides a passageway from an inside of the housing to an inside of the bladder within the balloon envelope, wherein a passive valve having a periphery is positioned over the port, and a control system that is configured, upon receiving a signal to increase the amount of air within the bladder within the balloon envelope, to cause the impeller to operate to cause the passive valve to move from a first, closed position where a seal is provided by the engagement of the periphery of the passive valve and a periphery of the port to a second, open position where the periphery of the passive valve is disengaged from the periphery of the port by the force of air moved toward the port by the impeller to open the passageway between the housing and the bladder within the balloon envelope and to allow air to be forced into the bladder within the balloon envelope.

In a further aspect, a method is provided including the steps of operating a control system for a balloon comprised of a balloon envelope, a bladder positioned within the balloon envelope, a plate having a port, a housing secured to the plate, an impeller positioned within the housing, where the port provides a passageway from an inside of the housing to an inside of the bladder, where a passive valve having a periphery is positioned over the port, receiving a signal to increase the amount of air within the bladder within the balloon envelope, and causing the impeller to operate, thereby causing the passive valve to move from a first, closed position where a seal is provided by the engagement of the periphery of the passive valve and a periphery of the port to a second, open position where the periphery of the passive valve is disengaged from the periphery of the port by the force of air moved toward the port by the impeller to open the passageway between the housing and the bladder within the balloon envelope and to allow air to be forced into the bladder within the balloon envelope.

In a further aspect, a non-transitory computer readable medium is provided having stored therein instructions executable by a computing device to cause the computing device to perform functions comprising operating a control system for a balloon comprised of a a balloon envelope, a bladder positioned within the balloon envelope, a plate having a port, a housing secured to the plate, an impeller positioned within the housing, where the port provides a passageway from an inside of the housing to an inside of the bladder, where a passive valve having a periphery is positioned over the port, receiving a signal to increase the amount of air within the bladder within the balloon envelope, and causing the impeller to operate to force air towards the port, thereby causing the passive valve to move from a first, closed position where a seal is provided by the engagement of the periphery of the passive valve and a periphery of the port to a second, open position where the periphery of the passive valve is disengaged from the periphery of the port by the force of air moved toward the port by the impeller to open the passageway between the housing and the bladder within the balloon envelope and to allow air to be forced into the bladder within the balloon envelope.

In a further aspect, a balloon is provided having a balloon envelope and a bladder within the balloon envelope, means for adding air to a bladder within the balloon envelope and means for venting air from the bladder within the balloon envelope to the atmosphere.

These as well as other aspects, advantages, and alternatives, will become apparent to those of ordinary skill in the art by reading the following detailed description, with reference where appropriate to the accompanying drawings.

DETAILED DESCRIPTION

Figure 1:
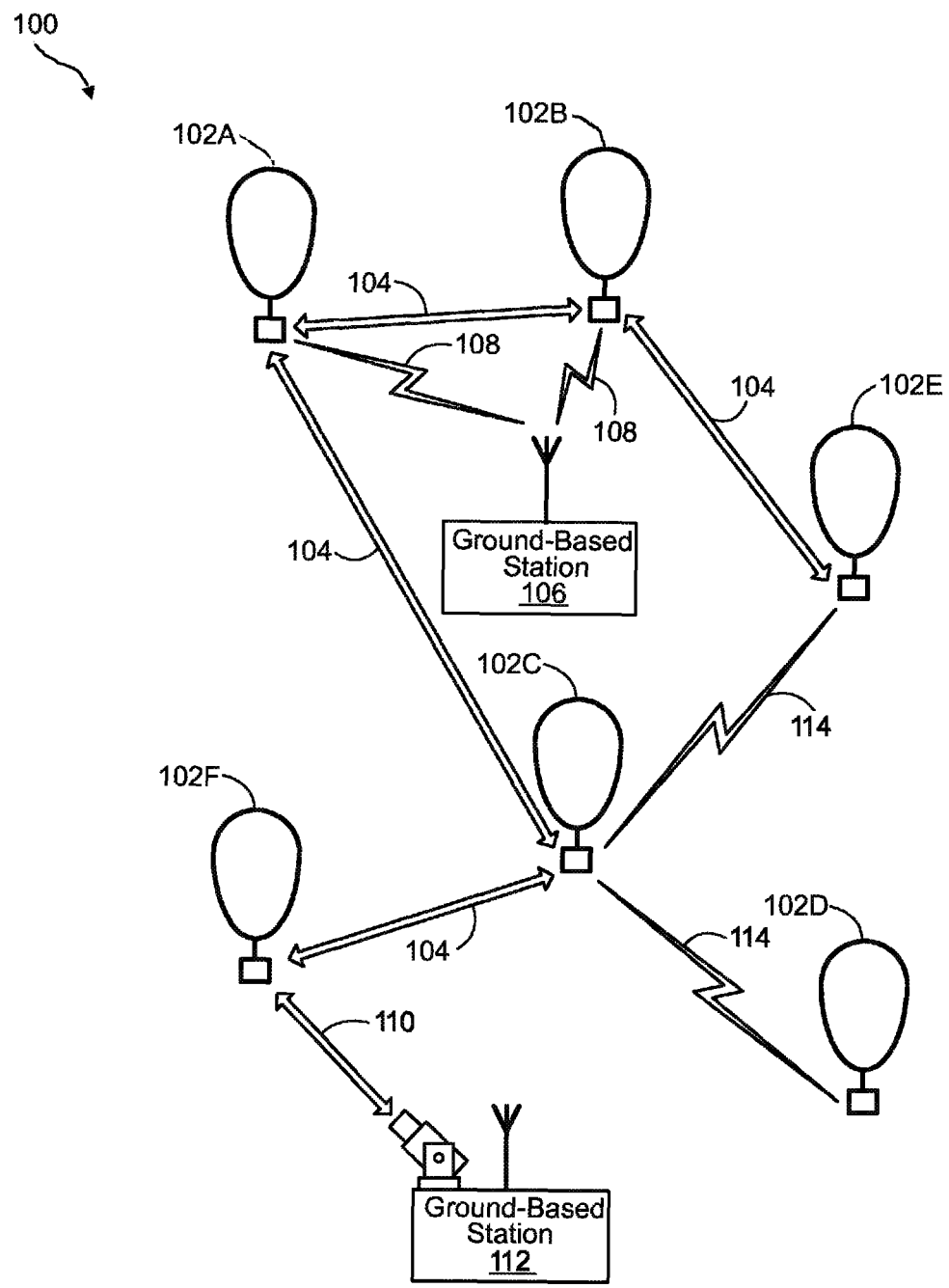
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Exemplary embodiments may be implemented in association with a data network that includes a plurality of balloons. In an exemplary embodiment, such balloons may include an envelope, a payload, an air mass fill mechanism, and an air mass release mechanism.

The balloon envelope may be filled with a lifting gas such as helium or hydrogen to provide a lifting force to keep the balloon aloft. One method of controlling the altitude of the balloon is by controlling the amount of lifting gas that is within the balloon envelope. With this method of altitude control, lifting gas may be released from the balloon envelope to reduce the lifting force and lower the balloon, or added to the balloon envelope to increase the lifting force and raise the balloon. However, there may be a finite amount of lifting gas available and it may therefore be undesirable to release lifting gas from the balloon envelope to the atmosphere. Therefore, it would be desirable to provide a means for controlling the altitude of a balloon that did not require releasing or adding lifting gas to the balloon envelope.

In the present disclosed embodiments, the altitude of a balloon may be controlled by controlling the amount of air, and thus the mass of air, that is positioned within the balloon envelope. In particular, the altitude of the balloon may be increased by reducing the amount of air within the balloon envelope, which in turn reduces the mass of air within the balloon and overall weight of the balloon. Such a reduction in air mass may be desirable at night when the environmental temperatures are low and the temperature of the lifting gas within the balloon envelope is reduced.

Conversely, the altitude of the balloon may be lowered by increasing the amount of air within the balloon envelope, which in turn increases the mass of air mass within the balloon and the overall weight of the balloon. Such an increase in air mass may be desirable during the day when the environmental temperatures are high and the temperature of the lifting gas within the balloon envelope is increased.

An air-filled bladder, which may be also referred as a ballonet, may be positioned within the balloon envelope. As noted above, the altitude of the balloon may be controlled by controlling the amount, and therefore the mass, of air within the bladder. When it is desired to the lower the altitude of the balloon, additional air may be added to the bladder to increase the overall weight of the balloon resulting in lowering the altitude of the balloon. Conversely, when it is desired to raise the altitude of the balloon, air may be removed from the bladder to reduce the overall weight of the balloon resulting in raising the altitude of the balloon.

The present embodiments provide an air mass fill mechanism that may be used to force air into the bladder of the balloon to increase the amount of air mass within the bladder and increase the overall weight of the balloon when desired. Air may be pumped into the bladder with a pump or impeller, and valves may be opened or closed to allow or prevent air from entering the bladder. For example, when it is desired to force air into the bladder, one or more valves could be opened to provide a passageway for air to enter the bladder. When aloft, the balloons may experience an extremely wide environmental temperature range. It may be very hot during the day when the sun is out and very cold at night when the sun is down. In order for the fill mechanism to work properly, the valves must be able to reliably operate in the extreme heat and the extreme cold that will be encountered. In particular, the valves must not "stick" in the open or closed position.

The present embodiments advantageously provide a fill mechanism that includes a passive valve system that does not require electrical activation. In particular, a plate having one or more inlet ports is provided that may be attached to the balloon beneath the balloon envelope and the bladder positioned within the balloon envelope. A housing is positioned beneath the plate having an end that is positioned about the one or more inlet ports. A pump or impeller is positioned within the housing that is used to force air towards and through the one or more inlet ports in the plate and into the bladder of the balloon. The term "impeller" as used herein is to be broadly construed to cover impellers, pumps, and any other devices that could be used to force air towards the inlet ports.

Each of the one or more inlet ports positioned in the plate provides a passageway between the inside of the housing and the inside of the bladder to allow air to be forced into the bladder when the impeller is operating. Each of the one or more inlet ports has a seat against which a passive valve, such as an umbrella valve, may be seated. In particular, when the passive valve is in a first, closed position, the periphery of the inlet port engages the periphery of the umbrella valve. The air volume within the bladder is under pressure. Therefore, the air pressure within the bladder normally forces the periphery of each umbrella valve against the periphery of the inlet port, where a seal is formed preventing air from escaping from the bladder.

When it is desired to add air to the bladder, the impeller is turned on and air is forced towards the inlet ports in the plate. A pressure against the bottom of the umbrella valve is caused by the force of the air moved towards the inlet ports by the impeller. As the impeller operates, the force on the bottom of the umbrella valve caused by the air moved towards the inlet ports by the impeller becomes greater than the force of the air pressure within the bladder acting on the top of the umbrella valve, causing the periphery of the umbrella valve to disengage from the periphery of the inlet port. As a result of this disengagement, the seal between the umbrella valve and the periphery of the inlet port is opened allowing air to be forced through the inlet port and into the bladder.

The passive valve system provided herein allows the inlet ports to be opened and closed without requiring electrical actuation of a valve, therefore eliminating the possibility of an electrical malfunction. In addition, the inlet ports may be opened and closed without requiring a valve having moving parts, therefore eliminating the possibility of having a valve that becomes "stuck" in an open or closed position. As a result, reliable operation of the air mass fill mechanism may be provided throughout the extreme temperatures that are encountered in operation. In addition, the altitude of the balloon may be effectively reduced by adding air mass to the balloon, and does not require the venting of lifting gas.

The present embodiments also provide an air mass release mechanism that may be used to vent or release air from the bladder of the balloon to decrease the amount of air mass within the bladder and decrease the overall weight of the balloon. Air may be vented or released from the bladder through one or more outlet ports providing a passageway between the bladder and the atmosphere. For example, when it is desired to vent or release air from the bladder, a valve could be opened to provide a passageway for air to be released from the bladder into the atmosphere.

The present embodiments advantageously provide an air mass release mechanism that may reliably vent or release air from the bladder. In particular, a plate having one or more outlet ports is provided that may be attached to the balloon beneath the balloon envelope and bladder positioned within the balloon envelope. The housing that includes the impeller used as part of the air mass fill mechanism is positioned beneath the plate. The outlet ports are located on the plate at a position beyond the diameter of the bottle-shaped housing, so that a passageway between the inside of the bladder and the atmosphere is provided. A bracket may extend beneath the plate where a first end of a linear actuator may be mounted. The second end of the linear actuator is attached to a valve member that is positioned over the outlet port.

Although a single outlet port could be used, to provide a fail-safe mechanism, a redundancy may be provided wherein two outlet ports are used. In this embodiment, two linear actuators positioned on the left and right sides of the bottle-shaped housing, 180 degrees apart, may be positioned beneath the outlet ports. These two linear actuators are attached to two respective umbrella valves positioned on the top of the plate.

Each outlet port has a seat against which an umbrella valve may be seated. In particular, the periphery of the outlet port engages the periphery of the umbrella valve. More particularly, the second end of the linear actuator is attached to a metal cross member that has edges or a periphery that abut against a lip formed in the base of the outlet port when the umbrella valve is in its normal, closed position. The umbrella valve is in turn attached to the cross member such that when the cross member abuts against the lip in the base of the outlet port, the periphery of the umbrella valve is engaged with the periphery of the outlet port to form a seal that prevents air from escaping from the bladder.

When it is desired to vent or remove air from the bladder, each linear actuator is activated, where the second end of the linear actuator moves the cross member away from engagement with the lip in the base of the outlet port, in turn causing the periphery of the umbrella valve to disengage from the periphery of the outlet port. As a result of this disengagement, the seal between the umbrella valve and the periphery of the outlet port is opened allowing air to be vented through the outlet port and released out of the bladder into the atmosphere. When a desired quantity of air is moved out of the bladder, the linear actuators are activated (or deactivated) and the air pressure within the bladder again forces the periphery of each umbrella valve against the periphery of the outlet port, where a seal is formed preventing air from escaping from the bladder.

In addition, the outlet ports may be opened and closed without requiring a valve having moving parts, therefore eliminating the possibility of having a valve that becomes "stuck" in an open or closed position. As a result, reliable operation of the air mass release mechanism may be provided throughout the extreme temperatures that are encountered in operation. In addition, the altitude of the balloon may be effectively increased by venting or releasing air mass from the balloon, and does not require additional lifting gas, which may not be available. Further, unlike some more complex systems, the linear actuators can operate independently of each other and do not require synchronization.

2. EXAMPLE BALLOON NETWORKS

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
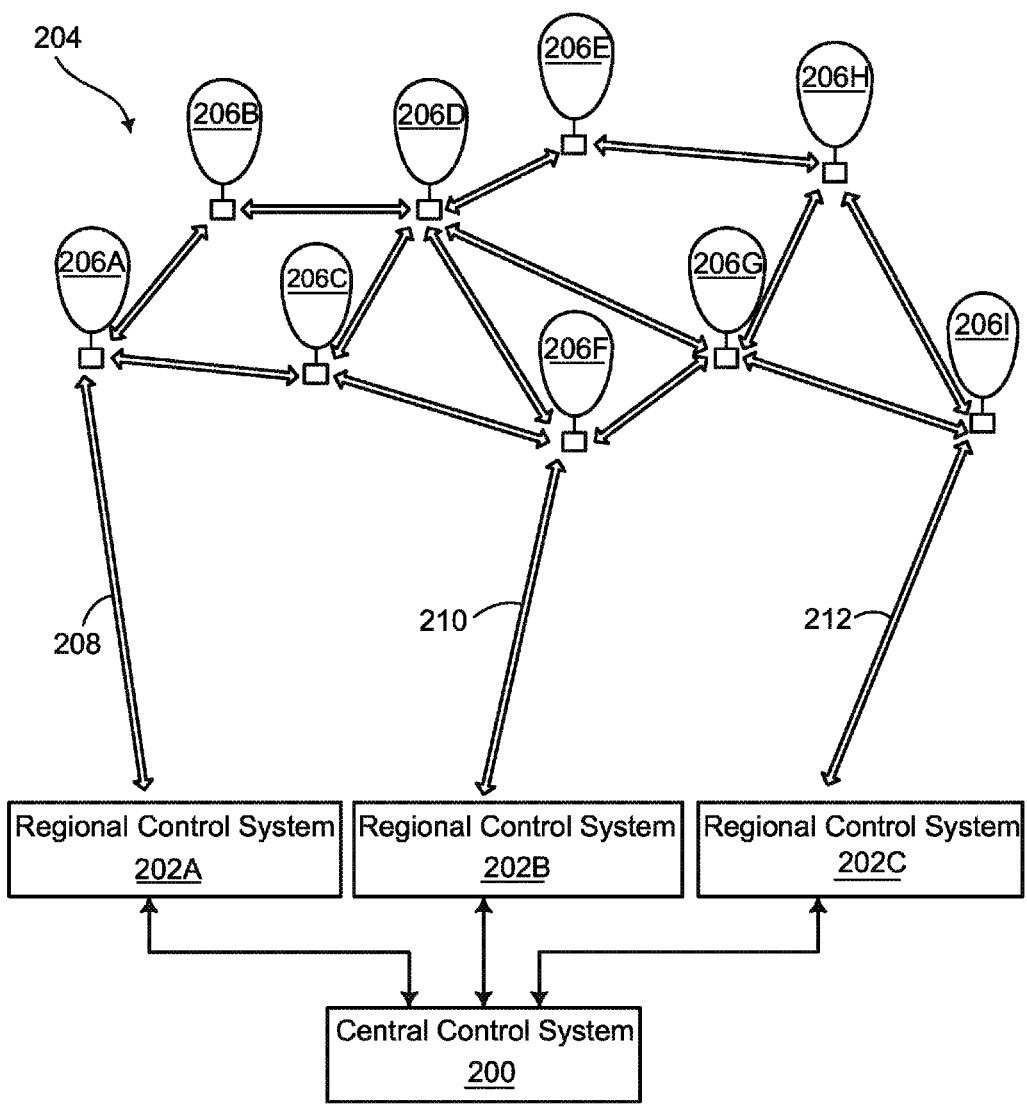
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons.

In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
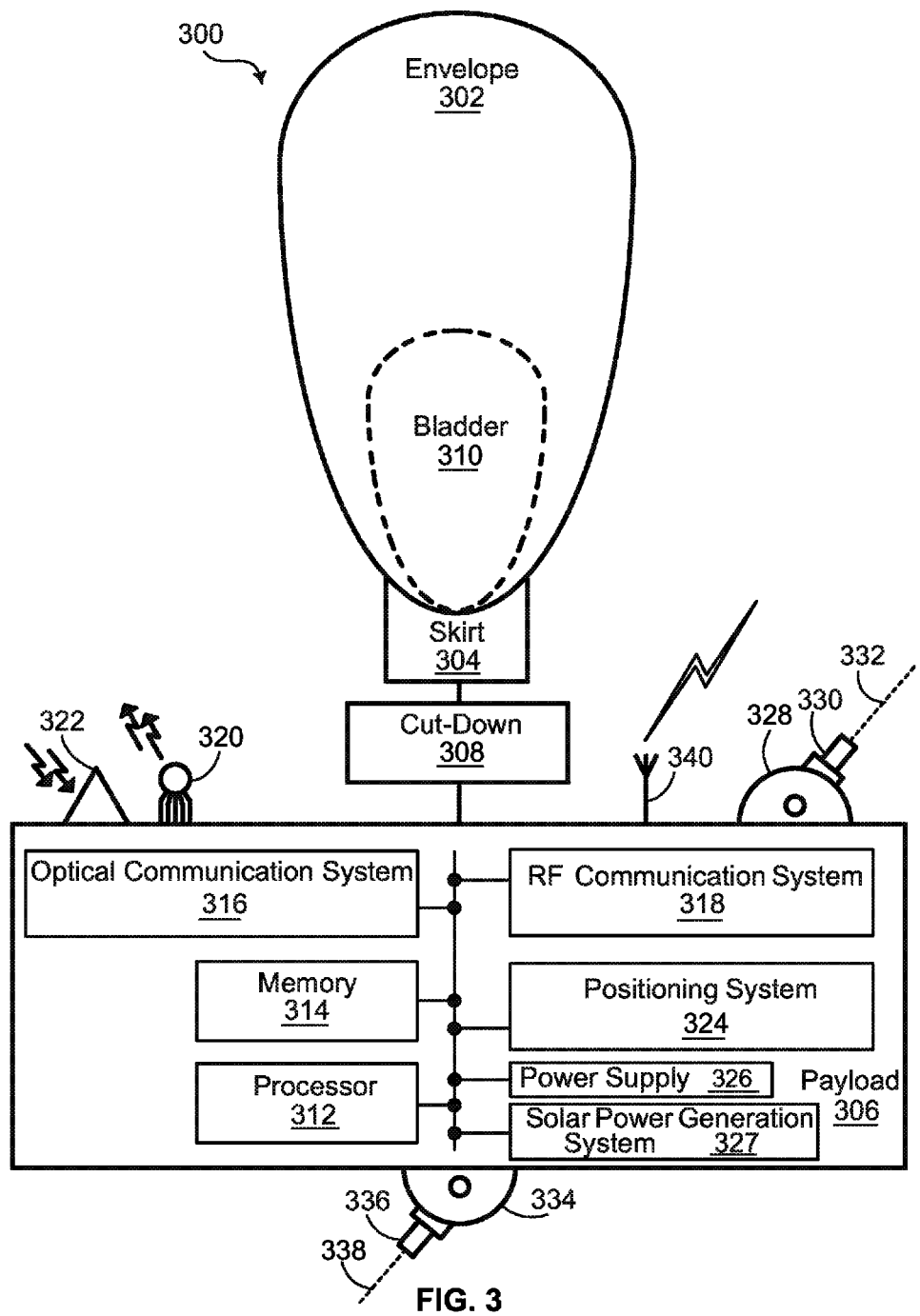
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. BALLOON NETWORK WITH OPTICAL AND RF LINKS BETWEEN BALLOONS

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
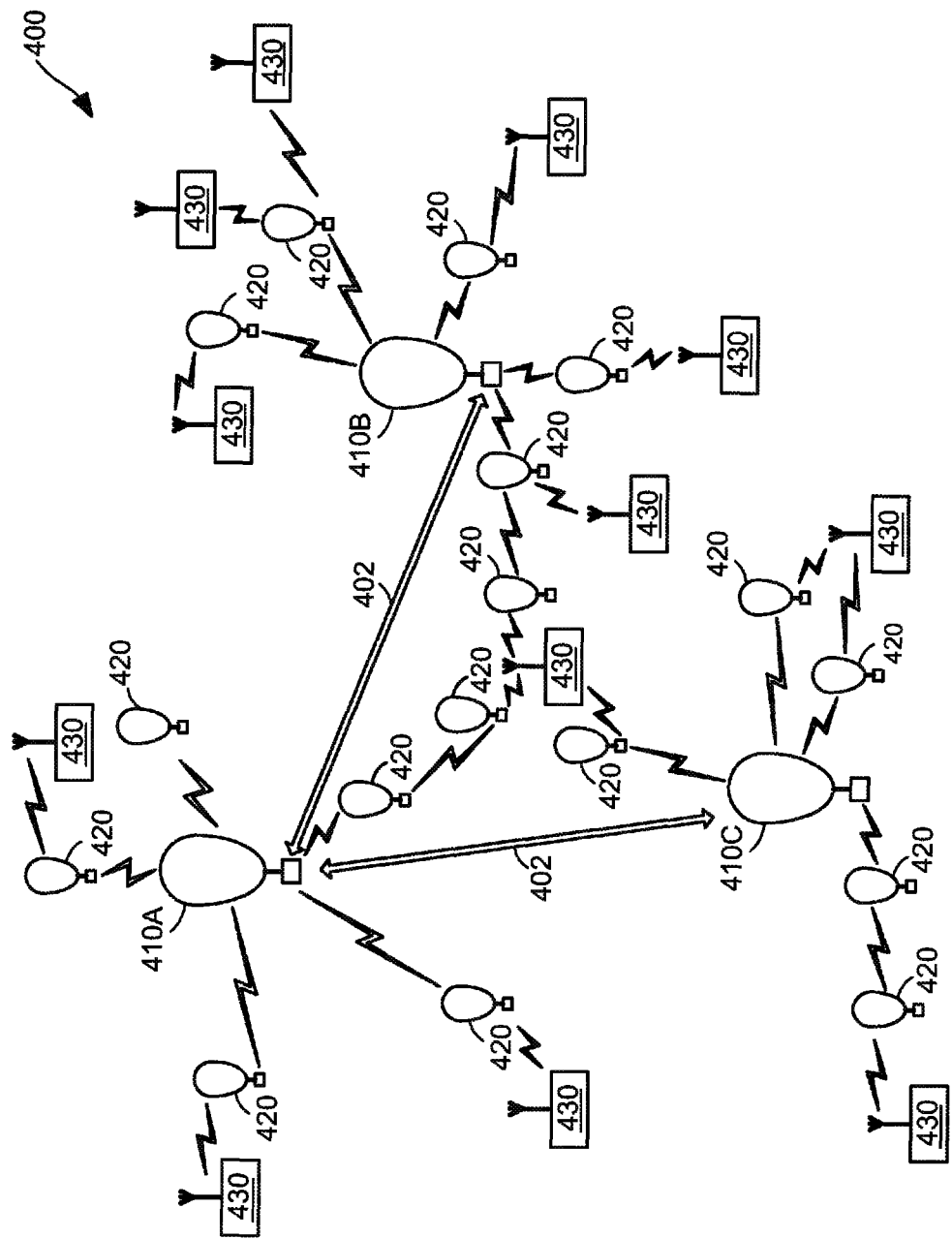
FIG. 4 shows a balloon network that includes super-nodes and sub-nodes, according to an example embodiment.
Figure 5:
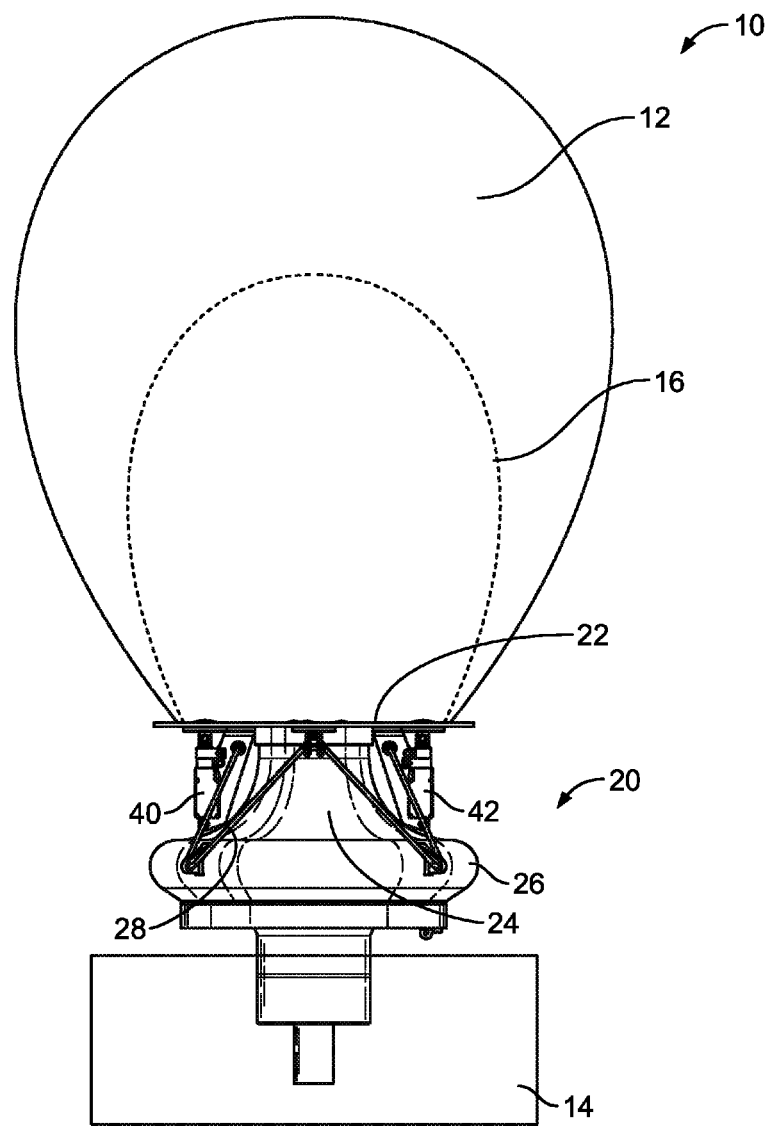
FIG. 5 shows a perspective view of a balloon 10 having an air mass fill and release mechanism 20 positioned beneath the balloon envelope 12 and above payload 14, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 Mbit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. EXAMPLES OF AN AIR MASS FILL MECHANISM

The present embodiments advantageously provide a fill mechanism that includes a passive valve system that does not require electrical activation. Referring now to FIGS. 5-8, a balloon 10 is shown having a balloon envelope 12 and bladder 16 positioned within the balloon envelope 12. An air mass fill and release mechanism 20 is secured beneath the balloon envelope 16 and may be secured above and to payload 14. The air mass fill and release mechanism 20 includes a plate 22 having one or more inlet ports 90, 92, and 94 positioned beneath the balloon envelope 12 and the bladder 16 positioned within the balloon envelope 12.

A housing 26 is positioned beneath the plate 22 having an end 24 that is positioned about the one or more inlet ports 90, 92, and 94. An impeller is positioned within the housing 26 that is used to force air towards and through the one or more inlet ports 90, 92, and 94 in the plate 22 and into the bladder 16 of the balloon envelope 12. The shape of the housing 26 is such that the air that is moved by an impeller positioned within the housing 26 is directed towards the inlet ports 90, 92, and 94. In particular, the end of the housing 24 positioned about the one or more inlet ports 90, 92, and 94 has a diameter that decreases towards the end so that the end of the housing is downwardly tapered towards the one or more inlet ports 90, 92, and 94. As noted above, the term "impeller" is to be interpreted broadly to include impellers, pumps, or any other devices that may be used to force air towards the inlet ports.

Figure 6:
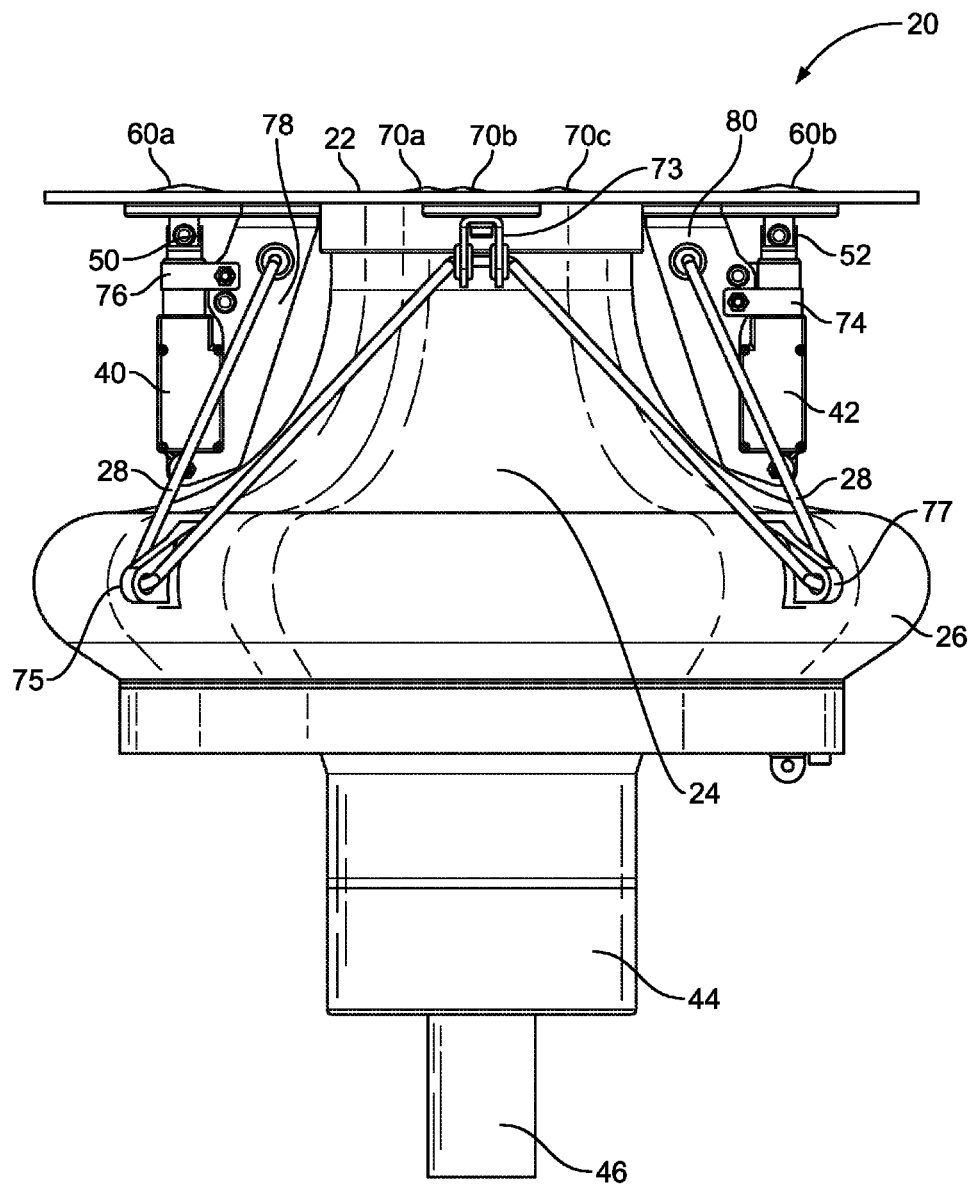
FIG. 6 shows a side view of the air mass fill and release mechanism 20 shown in FIG. 5, according to an example embodiment.
Figure 7:
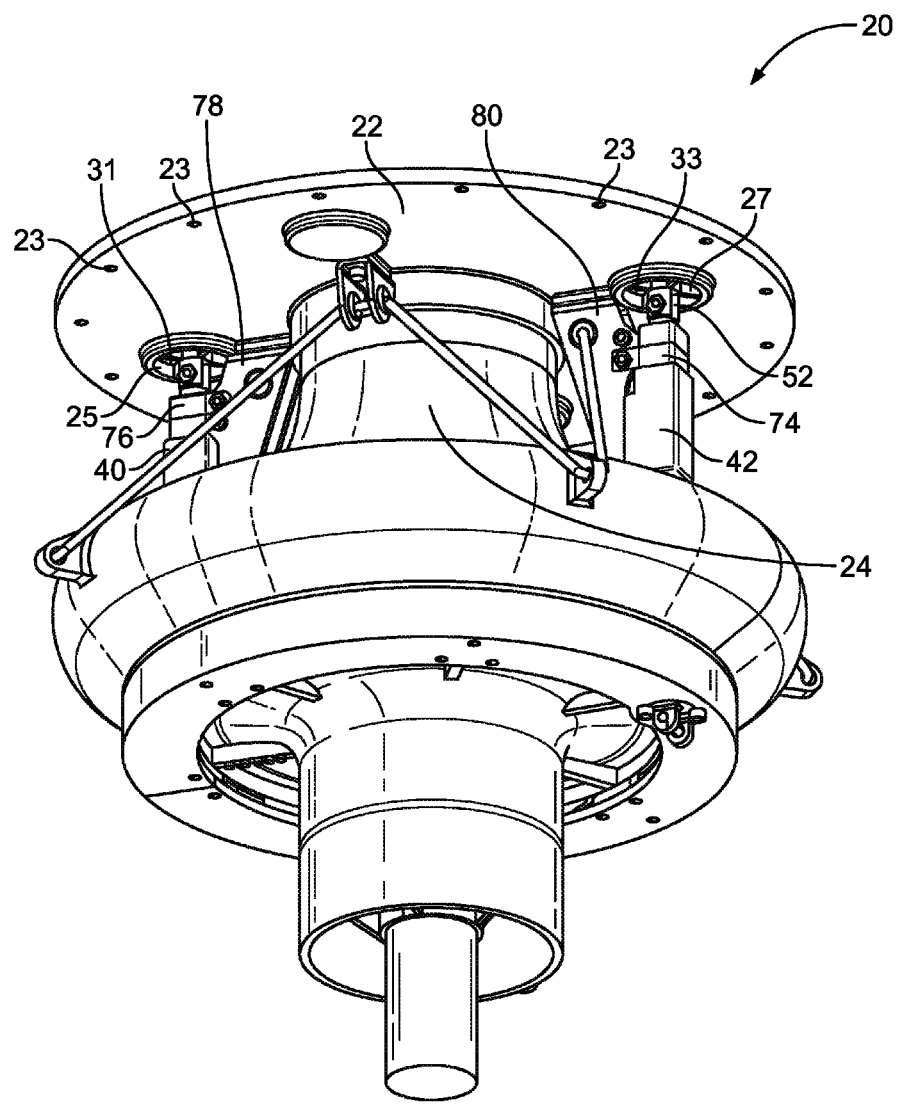
FIG. 7 shows a perspective bottom view of the air mass fill and release mechanism 20 shown in FIGS. 5 and 6, according to an example embodiment.
Figure 8:
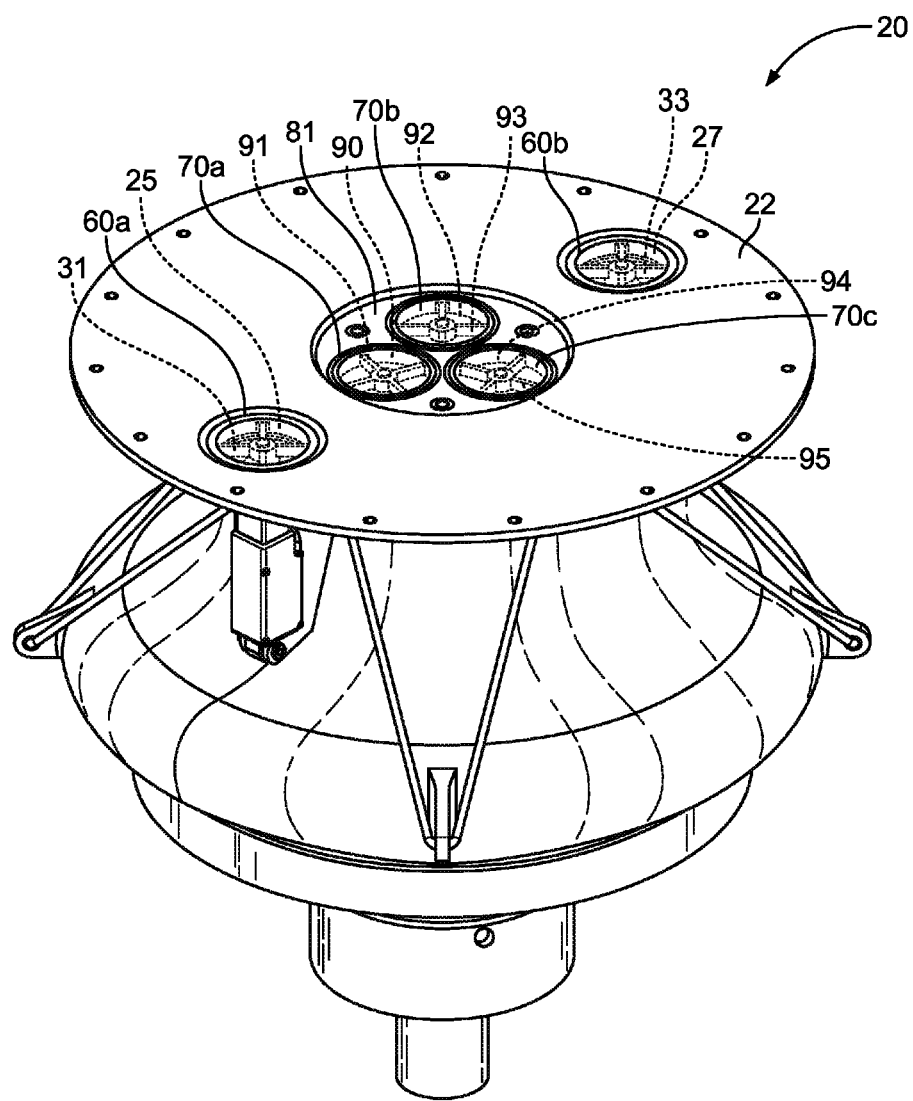
FIG. 8 shows a perspective top view of the air mass fill and release mechanism 20 shown in FIGS. 5-7, according to an example embodiment.

An inventive technique is used to secure the housing to the plate. In particular, as best shown in FIGS. 6 and 7, a series of brackets 78, 73, and 80 are positioned on the underside of the plate 22 and another series of brackets 75, 77 are positioned on the exterior of the housing 26 at staggered intervals. Apertures are positioned in the series of brackets 78, 73, 80 and 75, 77 such that a line or tether 28 may be threaded through the apertures of the series of brackets. The line 28 may be tightened to force the housing 26 against the bottom of the plate 22. The line 28 may be under high tension and may be a fiber line made of a high strength polymer, such as nylon or polypropylene, and may have a diameter of 2 mm. The housing 26 may be easily removed from the plate 22 by loosening the line or tether 28 and removing the line from the apertures in the series of brackets. As shown in FIGS. 7 and 8, the plate 22 includes a plurality of holes 23 that may be used to secure the plate 22 to the balloon envelope 12.

Figure 13A:
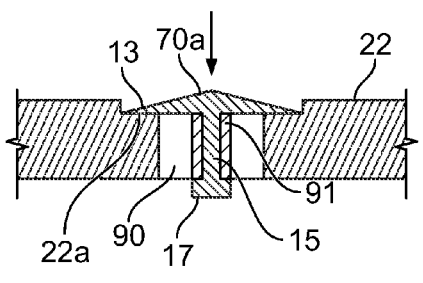
FIG. 13A shows a cross-sectional view of passive valve 70a positioned in a first, closed position within an inlet port in plate 22 of the air mass fill and release mechanism shown in FIGS. 5-12, according to an example embodiment.

Each of the one or more inlet ports 90, 92, and 94 positioned in the plate 22 provides a passageway between the inside of the housing 26 and the inside of the bladder 16 to allow air to be forced into the bladder 16 when the impeller is operating. Each of the one or more inlet ports 90, 92, and 94 has a seat against which a passive valve, such as umbrella valves 70a, 70b, and 70c, may be seated. In particular, when the passive valve (such as umbrella valves 70a, 70b, and 70c) is in a first, closed position, the periphery of the inlet port (such as inlet ports 90, 92, and 94) engages the periphery of the umbrella valve. The air volume within the bladder 16 is under pressure. Therefore, as illustrated in FIG. 13A, the air pressure within the bladder 16 normally forces the periphery 13 of each umbrella valve 70a, 70b, and 70c against the periphery 22a of the inlet ports 90, 92, and 94 where a seal is formed preventing air from escaping from the bladder 16.

Figure 13B:
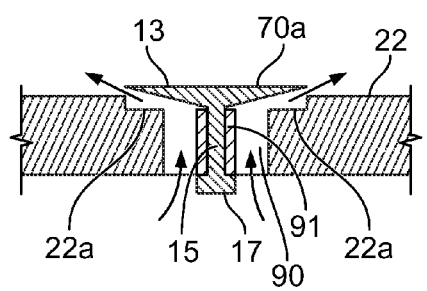
FIG. 13B shows a cross-sectional view of passive valve 70a shown in FIG. 13A in a second, open position within an inlet port in plate 22 of the air mass fill and release mechanism shown in FIGS. 5-12, according to an example embodiment.

When it is desired to add air to the bladder 16, the impeller is turned on and air is forced towards the inlet ports 90, 92, and 94 in the plate 22. A pressure against the bottom of each of the umbrella valves 70a, 70b, and 70c is caused by the force of the air moved towards the inlet ports 90, 92, and 94 by the impeller within the housing 26. As the impeller operates, as illustrated in FIG. 13B, the force on the bottom of the umbrella valves 70a, 70b, and 70c caused by the air moved towards the inlet ports 90, 92, and 94 by the impeller becomes greater than the force of the air pressure within the bladder 16 acting on the top of the umbrella valves 70a, 70b, and 70c, causing the periphery 13 of the umbrella valves 70a, 70b, and 70c to disengage from the periphery 22a of the inlet ports 90, 92, and 94. As a result of this disengagement, the seal between the umbrella valves 70a, 70b, and 70c and the periphery of the inlet ports 90, 92, and 94 is opened allowing air to be forced through the inlet ports 90, 92, and 94 and into the bladder 16. A pressure of 650 Pascals generated by the impeller within the housing 26 has been found to provide suitable flow into the bladder.

FIG. 8 is a perspective top view of the air mass fill and release mechanism 20. Umbrella valves 70a, 70b, and 70c are shown positioned in a center portion 81 of plate 22, over inlet ports 90, 92, and 94, respectively. Cross members 91, 93, and 95 are shown in dotted lines positioned within inlet ports 90, 92, and 94 to which umbrella valves 70a, 70b, and 70c are attached. The inlet ports 90, 92, and 94 are positioned in the center portion 81 of plate 22 so that they provide a passageway between inside of housing 26 and bladder 16. Furthermore, the center portion 81 of plate 22 is recessed below the main surface of plate 22. Preferably, the umbrella valves 70a, 70b, and 70c do not extend above the top of the recess of center portion 81 to protect the umbrella valves during assembly.

Figure 9:
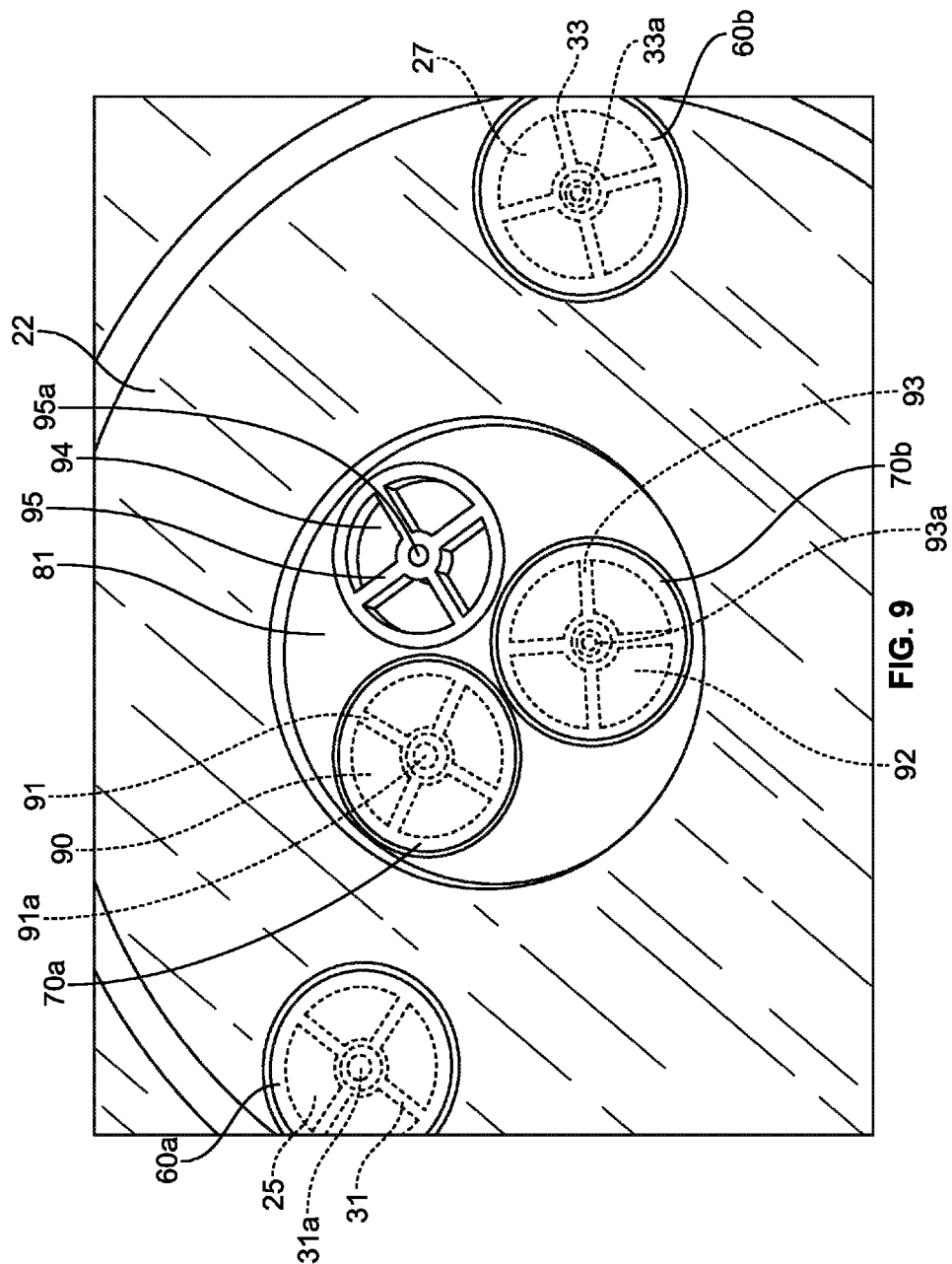
FIG. 9 shows a bottom view of the air mass fill and release mechanism shown in FIGS. 5-8 with linear actuator 40 positioned beneath outlet port 25, according to an example embodiment.

FIG. 9 is a close up perspective view of the top of the plate 22. Here umbrella valve 70a is shown positioned in center portion 81 of plate 22, over inlet port 90. Cross member 91 is shown in dotted lines positioned within inlet port 90. Umbrella valve 70a is secured to cross member 91 by having a stem that extends through aperture 91a of cross member 91 and is held in place with a barb as illustrated in FIGS. 13A and 13B. Similarly, umbrella valve 70b is shown positioned in center portion 81 of plate 22, over inlet port 92. Cross member 93 is shown in dotted lines positioned within inlet port 92. Umbrella valve 70b is secured to cross member 93 by having a stem that extends through aperture 93a of cross member 93 and is held in place with a barb as illustrated in FIGS. 13A and 13B.

Inlet port 94 is shown in plate 22 having cross member 95 and aperture 95a, and there is no umbrella valve positioned over inlet port 94. Each of inlet ports 90, 92, and 94 includes a periphery in a slight recess 22a (illustrated in FIGS. 13A and 13B) in center portion 81 of plate 22, around 1 mm deep that is highly polished to provide a good seal between the peripheries of umbrella valves 70a, 70b, and 70c the periphery of ports 90, 92, and 94, respectively.

Figure 10:
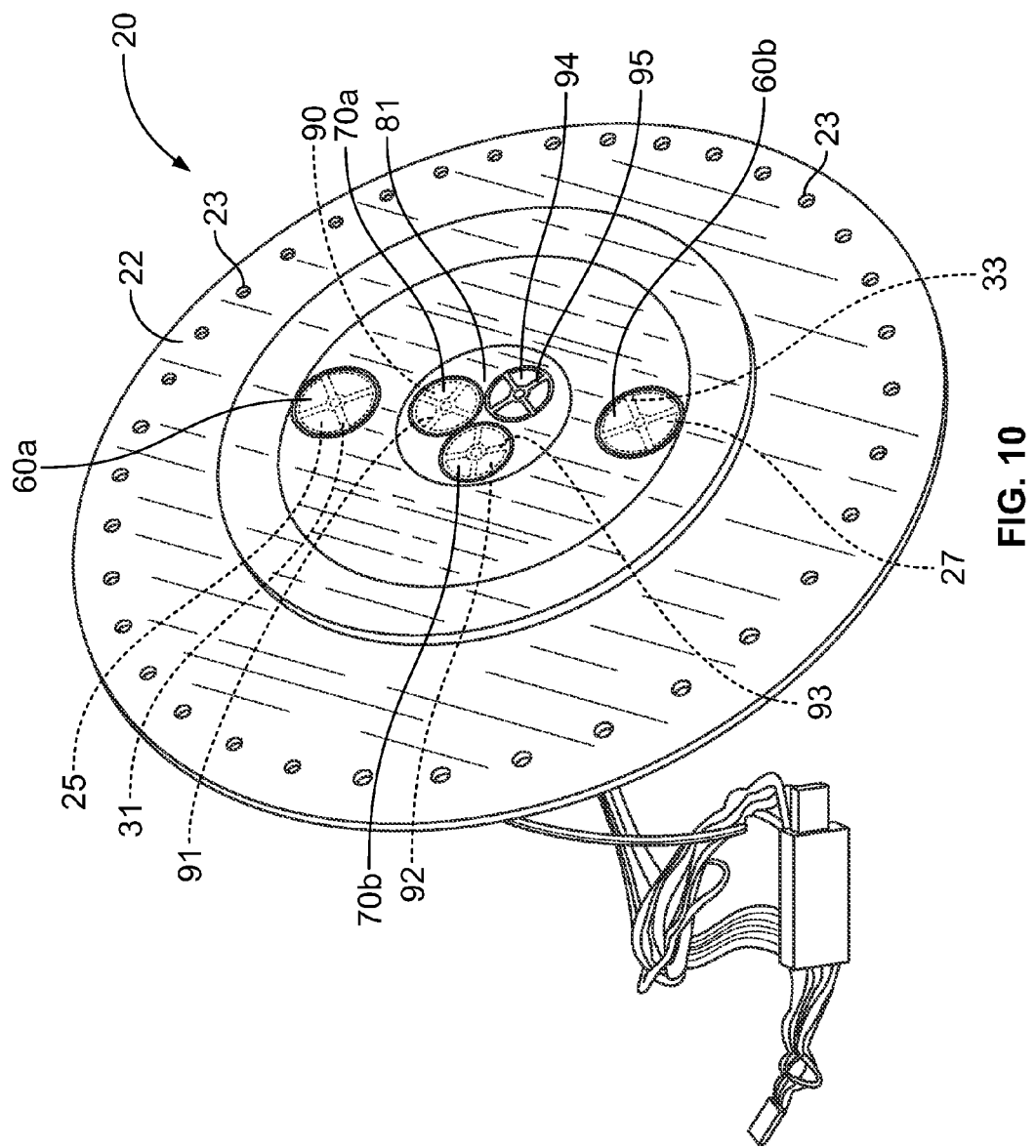
FIG. 10 shows an exploded view of the air mass fill and release mechanism shown in FIGS. 5-9, according to an example embodiment.

FIG. 10 is a perspective top view of air mass fill and release mechanism 20. Inlet ports 90, 92, and 94 are shown in recessed center portion 81 of plate 22. Cross members 91, 93, and 95 are shown positioned within inlet ports 90, 92, and 94 respectively. Umbrella valves 70a and 70b are shown positioned over inlet ports 90 and 92 respectively. It has been found that three inlet ports having a diameter of 28 millimeters provides for sufficient air flow into the bladder. The umbrella valves may be comprised of a silicone blend, or other substances that allow for some flexibility and the ability to form a seal against the plate 22. Further, although shown with a round periphery, the umbrella valves and ports could also have other geometries.

Figure 12:
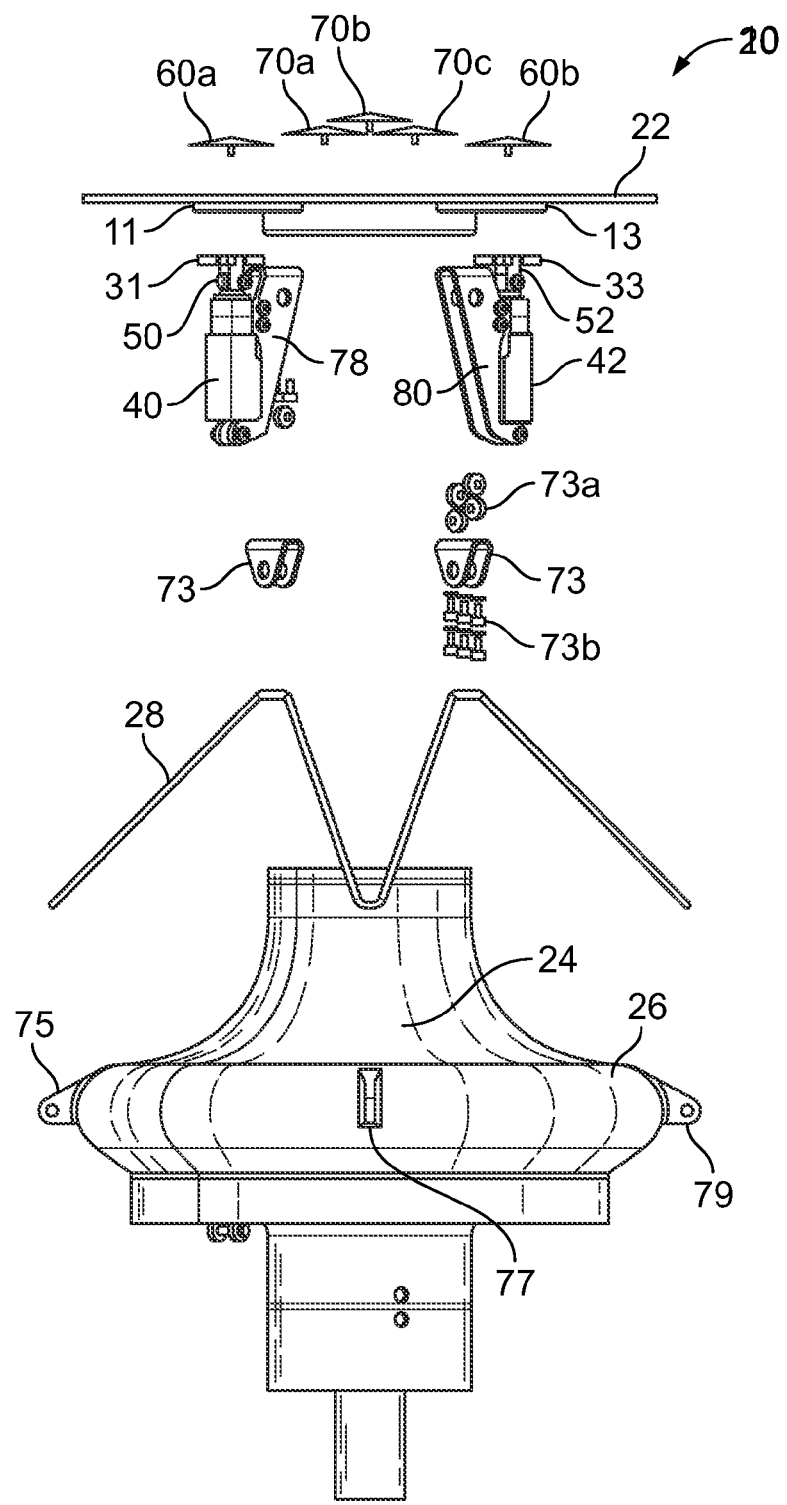
FIG. 12 shows a perspective top view of the air mass fill and release mechanism shown in FIGS. 5-11, according to an example embodiment.

FIG. 12 is an exploded view of air mass fill and release mechanism 20. Housing 26 having tapered end 24 is shown with brackets 75, 77, and 79 positioned on an exterior of housing 26. Housing 26 may be made of a lightweight material, such as a cast urethane or thermoplastic material. Housing 26 could also be made of a lightweight aluminum or magnesium alloy, or a composite material. Line 28 is shown that threads through apertures in brackets 75, 77, and 79, and brackets 73 that are attached to plate 22 with bolts 73b and nuts 73a, as well as apertures in brackets 78 and 80. Umbrella valves 70a, 70b, and 70c are shown positioned above plate 22. Plate 22 is preferably made of a lightweight aluminum, although other lightweight materials suitable for providing a sealing surface against the periphery of an umbrella valve could also be used.

As illustrated in FIGS. 13A and 13B, the umbrella valves 70a, 70b, and 70c are held in place within cross members 91, 93, and 95 respectively by a barb, such as a button barb. As shown in FIG. 13A, a barb 17 is positioned on the end of a stem 15 of the umbrella valve 70a that passes through a central aperture 91a in a cross member 91 positioned within the inlet port 90. The barb 17 holds the umbrella valve 70a in place as air enters the bladder 16, and prevents the umbrella valve 70a from being from being forced into the bladder 16. In FIG. 13A, the umbrella valve 70a is held in a first, closed position with periphery 13 of umbrella valve 70a positioned against recessed periphery 22a of inlet port 90. The air pressure within the bladder 16 acts in a direction of the arrow to create a seal between periphery 13 of umbrella valve 70a and recessed periphery 22a of inlet port 90 to prevent air from escaping from the bladder 16.

When it is desired to add air to the bladder 16, the impeller is turned on and air is forced towards inlet port 90. A pressure against the bottom of the periphery 13 of umbrella valve 70a is caused by the force of the air moved towards the inlet port 90 by the impeller within the housing 26. As the impeller operates, as illustrated in FIG. 13B, the force on the bottom the periphery 13 of the umbrella valves 70a caused by the air moved towards the inlet port 90 by the impeller becomes greater than the force of the air pressure within the bladder 16 acting on the top of the umbrella valves 70a, causing the periphery 13 of umbrella valves 70a to disengage from the periphery 22a of inlet port 90. As a result of this disengagement, the seal between the periphery 13 of umbrella valve 70a and the periphery 22a of the inlet port 90 is opened allowing air to be forced through the inlet port 90 as shown by the arrows and into the bladder 16.

When a desired quantity of air is moved into the bladder 16, the impeller is turned off and the air pressure within the bladder again forces the periphery 13 of umbrella valve 70a against the periphery 22a of the inlet port 90 as shown in FIG. 13A, where a seal is again formed preventing air from escaping from the bladder 16.

The passive valve system provided herein allows the inlet ports 90, 92, and 94 to be opened and closed without requiring electrical actuation of a valve, therefore eliminating the possibility of an electrical malfunction. In addition, the inlet ports 90, 92, and 94 may be opened and closed without requiring a valve having moving parts, therefore eliminating the possibility of having a valve that becomes "stuck" in an open or closed position. As a result, reliable operation of the air mass fill mechanism may be provided throughout the extreme temperatures that are encountered in operation. In addition, the altitude of the balloon may be effectively reduced by adding air mass to the balloon, and does not require the venting of lifting gas.

5. EXAMPLES OF AN AIR MASS RELEASE MECHANISM

The present embodiments also provide an air mass release mechanism that may be used to vent or release air from the bladder of the balloon to decrease the amount of air mass within the bladder and decrease the overall weight of the balloon. Referring back to FIGS. 5-8, air may be vented or released from the bladder 16 through one or more outlet ports 25 and 27 providing a passageway between the bladder 16 and the atmosphere. For example, when it is desired to vent or release air from the bladder, a valve could be opened to provide a passageway for air to be released from the bladder into the atmosphere.

The present embodiments advantageously provide an air mass fill and release mechanism 20 that may reliably vent or release air from the bladder 16. In particular, a plate 22 having one or more outlet ports 25 and 27 is provided that may be attached to the balloon 10 beneath the balloon envelope 12 and bladder 16 positioned within the balloon envelope 12. The housing 26 that includes the impeller used as part of the air mass fill mechanism is positioned beneath the plate 22. The outlet ports 25 and 27 are located on the plate 22 at a position beyond the diameter of the end 24 of bottle-shaped housing 26, so that a passageway between the inside of the bladder 16 and the atmosphere is provided through outlet ports 25 and 27.

A pair of linear actuators 40 and 42 can be used to open and close outlet ports 25 and 27. A bracket 78 may extend beneath the plate 22 where a first end of linear actuator 40 may be mounted to bracket 78 with mounting bracket 76. The second end of the linear actuator 40 is attached to a passive valve member 60a that is positioned over the outlet port 25. Similarly, bracket 80 may extend beneath the plate 22 where a first end of linear actuator 42 may be mounted to bracket 80 with mounting bracket 74. The second end of the linear actuator 42 is attached to a passive valve member 60b that is positioned over the outlet port 27.

Although a single outlet port could be used, to provide a fail-safe mechanism, a redundancy may be provided wherein two outlet ports 25 and 27 are used. In this embodiment, two linear actuators 40 and 42 are positioned on the left and right sides of the bottle-shaped housing 26, 180 degrees apart, positioned beneath the outlet ports 25 and 27. These two linear actuators 40 and 42 are attached to two respective umbrella valves 60a and 60b positioned on the top of the plate 22.

Figure 11:
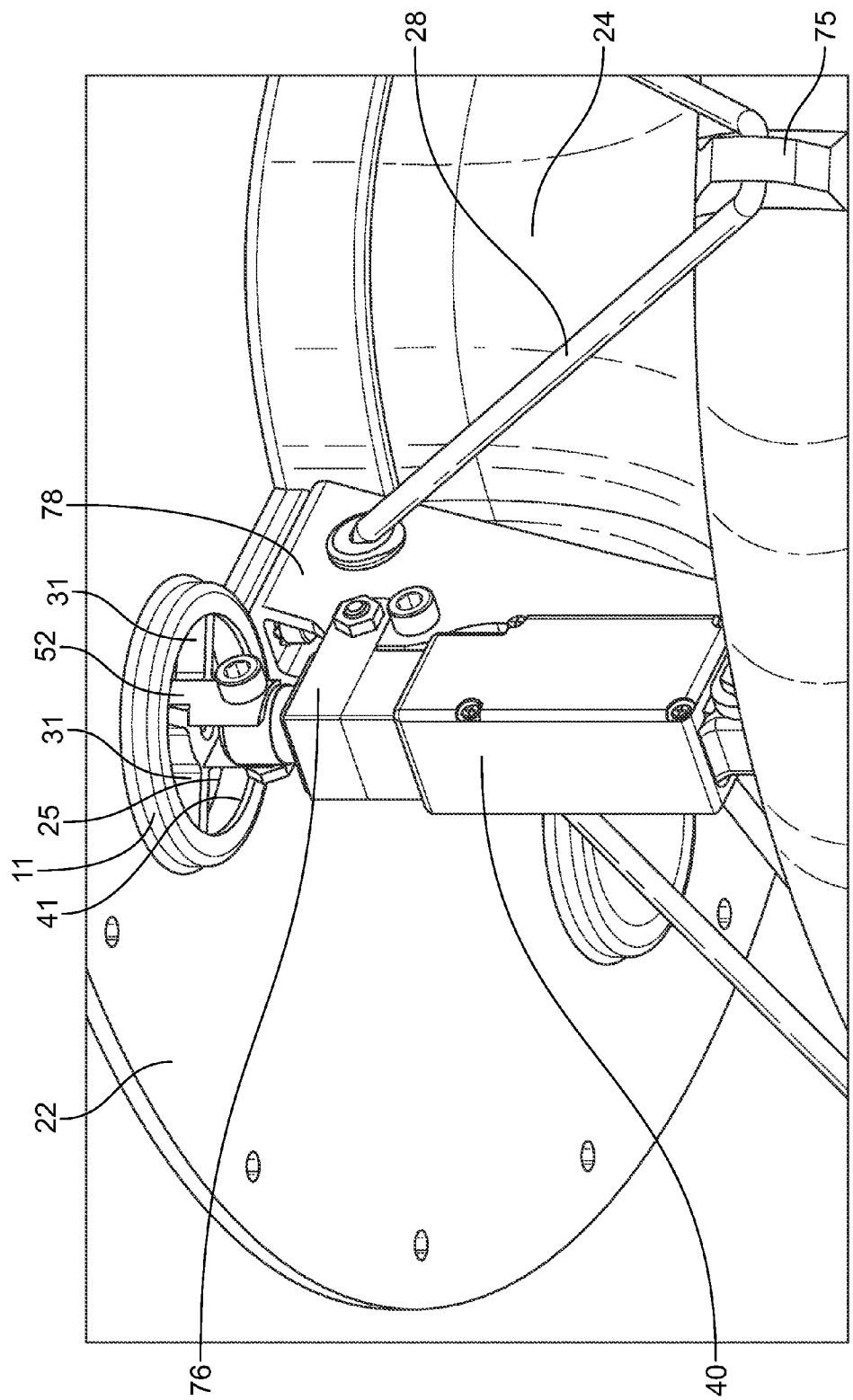
FIG. 11 shows a perspective close up view of the top of the air mass fill and release mechanism shown in FIGS. 5-10, according to an example embodiment.
Figure 14A:
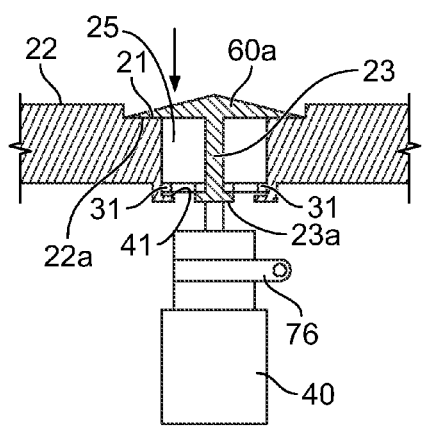
FIG. 14A shows a cross-sectional view of passive valve 60a in a first, closed position within an outlet port in plate 22 of the air mass fill and release mechanism shown in FIGS. 5-12, according to an example embodiment.
Figure 14B:
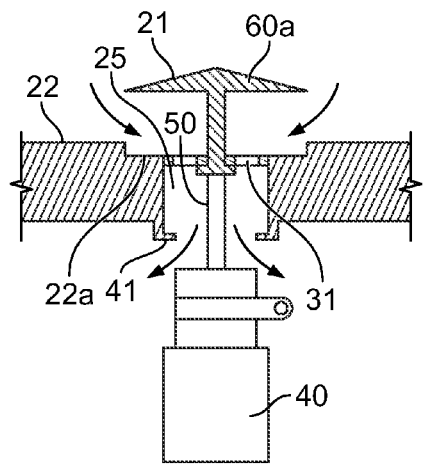
FIG. 14B shows a cross-sectional view of passive valve 60a shown in FIG. 14A in a second, open position within an outlet port in plate 22 of the air mass fill and release mechanism shown in FIGS. 5-12, according to an example embodiment.

As shown with reference to FIGS. 6, 7 and 11, linear actuator 40 has a second end 50 that moves upwardly when the linear actuator 40 is activated (or deactivated). Second end 50 is attached to a cross member 31 positioned within outlet port 25. The umbrella valve 60a is attached to cross member 31 by having a stem that extends through aperture 31a of cross member 31 and is held in place with a barb as illustrated in FIGS. 14A and 14B. Similarly, linear actuator 42 has a second end 52 that moves upwardly when the linear actuator 42 is activated (or deactivated). Second end 52 is attached to a cross member 33 positioned within outlet port 27. The umbrella valve 60b is attached to cross member 33 by having a stem that extends through aperture 33a of cross member 33 and is held in place with a barb as illustrated in FIGS. 14A and 14B.

Outlet port 25 has a seat against which umbrella valve 60a may be seated. In particular, the periphery of the outlet port 25 engages the periphery of the umbrella valve 60a. More particularly, the second end 50 of the linear actuator 40 is attached to metal cross member 31 that has edges or a periphery that abut against a lip 41 formed in the base of the outlet port 25 when the umbrella valve 60a is in its normal, closed position. The umbrella valve 60a is in turn attached to the cross member 31 such that when the cross member 31 abuts against the lip 41 in the base of the outlet port 25, the periphery of the umbrella valve 60a is engaged with the periphery of the outlet port 25 to form a seal that prevents air from escaping from the bladder. Outlet port 22, cross member 33, and umbrella valve 60b are similarly configured.

When it is desired to vent or remove air from the bladder, linear actuator 40 is activated (or deactivated depending on the type of actuator), where the second end 50 of the linear actuator 40 moves the cross member 31 away from engagement with the lip 41 in the base of the outlet port 25, in turn causing the periphery of the umbrella valve 60a to disengage from the periphery of the outlet port 25. As a result of this disengagement, the seal between the umbrella valve 60a and the periphery of the outlet port 25 is opened allowing air to be vented through the outlet port 25 and released out of the bladder 16 into the atmosphere. When a desired quantity of air is moved out of the bladder 16, the linear actuator 40 is deactivated (or activated) and the air pressure within the bladder 16 again forces the periphery of the umbrella valve 60a against the periphery of the outlet port 25, where a seal is formed preventing air from escaping from the bladder 16.

Outlet port 27, cross member 33, and umbrella valve 60b operate in a similar manner. When it is desired to vent or remove air from the bladder 16, linear actuator 42 is activated (or deactivated depending on the type of actuator), where the second end 52 of the linear actuator 42 moves the cross member 33 away from engagement with the lip 41 in the base of the outlet port 27, in turn causing the periphery of the umbrella valve 60b to disengage from the periphery of the outlet port 27. As a result of this disengagement, the seal between the umbrella valve 60b and the periphery of the outlet port 27 is opened allowing air to be vented through the outlet port 27 and released out of the bladder 16 into the atmosphere. When a desired quantity of air is moved out of the bladder 16, the linear actuator 42 is deactivated (or activated) and the air pressure within the bladder 16 again forces the periphery of the umbrella valve 60b against the periphery of the outlet port 27, where a seal is formed preventing air from escaping from the bladder 16.

FIG. 6 shows umbrella valve 60a positioned above plate 22 and above linear actuator 40. Similarly umbrella valve 60b is shown positioned above plate 22 and above linear actuator 42. The umbrella valves 60a and 60b are positioned outside the diameter of the end 24 of housing 26 to provide a passageway between the inside of the bladder 16 and the atmosphere.

FIG. 7 shows cross member 31 positioned with outlet port 25, and cross member 33 positioned within outlet port 27.

FIG. 8 is a perspective top view of the air mass fill and release mechanism 20. Umbrella valves 60a and 60b are shown positioned outwardly from center portion 81 of plate 22, over outlet ports 25 and 27, respectively. Cross members 31 and 33 are shown in dotted lines positioned within outlet ports 25 and 27 to which umbrella valves 60a and 60b are attached.

FIG. 9 is a close up perspective view of the top of the plate 22. Here umbrella valve 60a is shown positioned above outlet port 25, with cross member 31 shown in dotted lines positioned within outlet port 25. Umbrella valve 60a is secured to cross member 31 by having a stem that extends through aperture 31a of cross member 31 and is held in place with a barb as illustrated in FIGS. 14A and 14B. Similarly, umbrella valve 60b is shown positioned over outlet port 27. Cross member 33 is shown in dotted lines positioned within outlet port 27. Umbrella valve 60b is secured to cross member 33 by having a stem that extends through aperture 33a of cross member 33 and is held in place with a barb as illustrated in FIGS. 14A and 14B.

Outlet port 25 and outlet port 27 each include a periphery in a slight recess 22a (illustrated in FIGS. 14A and 14B) in plate 22, around 1 mm deep that is highly polished to provide a good seal between the peripheries of umbrella valves 60a and 60b and the periphery of outlet ports 25 and 27, respectively.

FIG. 10 is a perspective top view of air mass fill and release mechanism 20. Outlet ports 25 and 27 are shown in plate 22. Cross members 31 and 33 are shown positioned within outlet ports 25 and 27 respectively. Umbrella valves 60a and 60b are shown positioned over outlet ports 25 and 27 respectively. It has been found that two outlet ports each having a diameter of 25 millimeters provides for sufficient air flow out of the bladder.

FIG. 11 is a close up perspective view of the linear actuator 40, outlet port 25, cross member 31, and lip 41 positioned in outlet port 25. Lip 41 is formed by extension 11 that extends downwardly from the bottom of plate 22. In this view, the cross member 31 is positioned against lip 41, thereby positioning the umbrella valve 60a that is attached to cross member 31 in its normal, closed position. Linear actuator 40 is attached to bracket 78 that extends from the bottom of plate 22 with mounting bracket 76. Second end 52 of linear actuator 40 is shown attached to cross member 31.

FIG. 12 is an exploded view of air mass fill and release mechanism 20. Umbrella valves 60a and 60b are shown positioned above plate 22. Linear actuator 40 is shown with second end 50 attached to cross member 31 and first end attached to bracket 78. Linear actuator 42 is shown with second end 52 attached to cross member 33 and first end attached to bracket 80.

As illustrated in FIGS. 14A and 14B, the umbrella valves 60a and 60b are held in place within cross members 31 and 33 respectively by a barb, such as a button barb 23a. As shown in FIG. 14A, a barb 23a is positioned on the end of a stem 23 of the umbrella valve 60a that passes through a central aperture 31a in a cross member 31 positioned within the outlet port 27. The barb 23a holds the umbrella valve 60a in place against the cross member 31 as air exits the bladder 16. In FIG. 14A, the umbrella valve 60a is held in a first, closed position with periphery 21 of umbrella valve 60a positioned against recessed periphery 22a of outlet port 25. The air pressure within the bladder 16 acts in a direction of the arrow to create a seal between periphery 21 of umbrella valve 60a and recessed periphery 22a of outlet port 25 to prevent air from escaping from the bladder 16.

When it is desired to remove air from the bladder 16, the linear actuator 40 is activated so that the second end 50 is moved upwardly to cause the periphery 21 of umbrella valves 60a to disengage from the periphery 22a of outlet port 25. As a result of this disengagement, the seal between the periphery 21 of umbrella valve 60a and the periphery 22a of the outlet 25 is opened allowing air to be forced through outlet port 25 as shown by the arrows out of the bladder 16 and into the atmosphere.

When a desired quantity of air is moved out of bladder 16, the linear actuator is activated to move back into the position shown in FIG. 14A, where the air pressure within the bladder again forces the periphery 21 of umbrella valve 60a against the periphery 22a of the outlet port 25, where a seal is again formed preventing air from escaping from the bladder 16.

Although the air mass release mechanism is not as passive as the air mass fill mechanism, it may reliably operate in the extreme temperature ranges that may be encountered in operation. In particular, when the linear actuator (available from Firgelli) is ultrasonically cleaned and lubricated with a low-temperature grease such as Molykote, the linear actuators reliably operate at low temperatures. The valve system provided herein allows the outlet ports to be reliably opened and closed.

In addition, the outlet ports 25 and 27 may be opened and closed without requiring a valve having moving parts, therefore eliminating the possibility of having a valve that becomes "stuck" in an open or closed position. As a result, reliable operation of the air mass release mechanism may be provided throughout the extreme temperatures that are encountered in operation. In addition, the altitude of the balloon may be effectively increased by venting or releasing air mass from the balloon, and does not require additional lifting gas, which may not be available. Further, unlike some more complex systems, the linear actuators can operate independently of each other and do not require synchronization.

Figure 15:
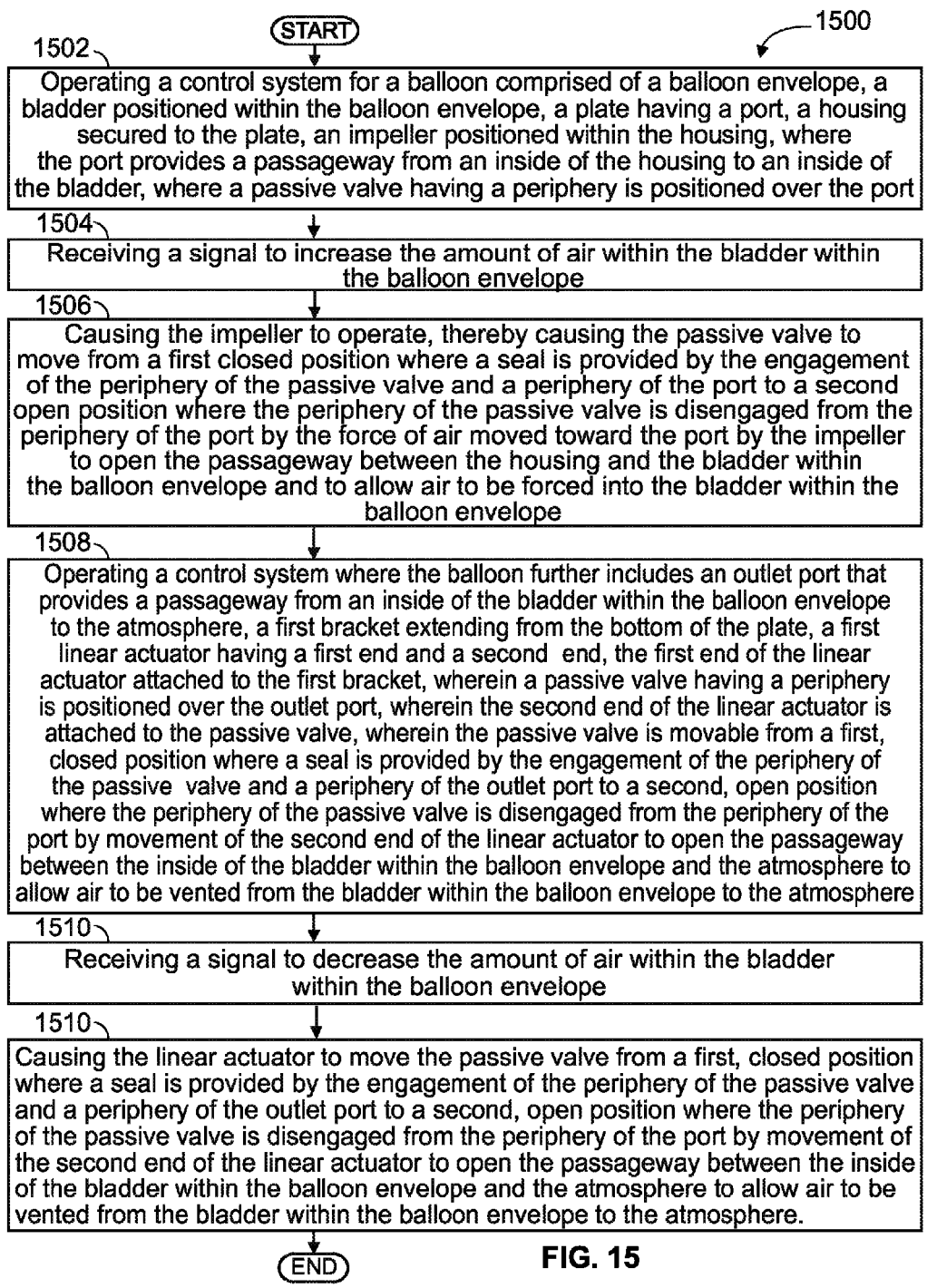
FIG. 15 is a method, according to an example embodiment.

FIG. 15 shows a method 1500 that is provided that includes the step 1502 of operating a control system for a balloon comprised of a balloon envelope, a bladder positioned within the balloon envelope, a plate having a port, a housing secured to the plate, an impeller positioned within the housing, where the port provides a passageway from an inside of the housing to an inside of the bladder, where a passive valve having a periphery is positioned over the port.

Method 1500 further includes the method step 1504 of receiving a signal to increase the amount of air within the bladder within the balloon envelope. Method 1500 also includes the step 1506 of causing the impeller to operate, thereby causing the passive valve to move from a first closed position where a seal is provided by the engagement of the periphery of the passive valve and a periphery of the port to a second open position where the periphery of the passive valve is disengaged from the periphery of the port by the force of air moved toward the port by the impeller to open the passageway between the housing and the bladder within the balloon envelope and to allow air to be forced into the bladder within the balloon envelope.

Method 1500 may further include the step 1508 of operating a control system where the balloon further includes an outlet port that provides a passageway from an inside of the bladder within the balloon envelope to the atmosphere, a first bracket extending from the bottom of the plate, a first linear actuator having a first end and a second end, the first end of the linear actuator attached to the first bracket, wherein a passive valve having a periphery is positioned over the outlet port, wherein the second end of the linear actuator is attached to the passive valve, wherein the passive valve is movable from a first, closed position where a seal is provided by the engagement of the periphery of the passive valve and a periphery of the outlet port to a second, open position where the periphery of the passive valve is disengaged from the periphery of the port by movement of the second end of the linear actuator to open the passageway between the inside of the bladder within the balloon envelope and the atmosphere to allow air to be vented from the bladder within the balloon envelope to the atmosphere.

Method 1500 may also further include the step 1510 of receiving a signal to decrease the amount of air within the bladder within the balloon envelope, as well as the step 1512 of causing the linear actuator to move the passive valve from a first, closed position where a seal is provided by the engagement of the periphery of the passive valve and a periphery of the outlet port to a second, open position where the periphery of the passive valve is disengaged from the periphery of the port by movement of the second end of the linear actuator to open the passageway between the inside of the bladder within the balloon envelope and the atmosphere to allow air to be vented from the bladder within the balloon envelope to the atmosphere.

6. A NON-TRANSITORY COMPUTER READABLE MEDIUM WITH INSTRUCTIONS TO CAUSE THE INLET PORTS TO BE IN AN OPEN OR CLOSED STATE, AND TO CAUSE THE OUTLET PORTS TO BE IN AN OPEN OR CLOSED STATE

Some or all of the functions described above and illustrated in FIGS. 5-14 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as the processor 312 illustrated in FIG. 3. Alternatively, the computing device that executes the stored instructions could be another computing device, such as a server in a server network, or a ground-based station.

The non-transitory computer readable medium may store instructions executable by the processor 312 to perform various functions. The functions could include causing the inlet ports to move from a first, closed position to a second, open position, and causing the outlet ports to move from a first, closed position to a second, open position, and vice versa.

7. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
a balloon envelope;
a plate having a port;
a housing secured to the plate;
an impeller positioned within the housing;
wherein the port provides a passageway from an inside of the housing to an inside of the balloon envelope;
wherein a passive valve having a periphery is positioned over the port;
wherein the passive valve is movable from a first, closed position where a seal is provided by the engagement of the periphery of the passive valve and a periphery of the port to a second, open position where the periphery of the passive valve is disengaged from the periphery of the port by the force of air moved toward the port by the impeller to open the passageway between the housing and the balloon envelope and allow air to be forced into the balloon envelope.

2. The apparatus of claim 1, wherein the passive valve includes a stem that remains in the same position within the port when the passive valve is in the first closed position or the second open position.

3. The apparatus of claim 1, wherein the passive valve requires no electrical actuation to move between the first closed position to the second open position.

4. The apparatus of claim 1, wherein a bladder is positioned within the balloon envelope, and the passageway allows air moved by the impeller to move from the inside of the housing into the bladder.

5. The apparatus of claim 1, further including one or more additional ports that provide a passageway from the inside of the housing to the inside of the balloon envelope;
wherein a passive valve having a periphery is positioned over each of the one or more additional ports;
wherein the passive valves positioned over the one or more additional ports are movable from a first, closed position where a seal is provided by the engagement of the periphery of the passive valves and a periphery of the respective ports to a second, open position where the periphery of the passive valves are disengaged from the periphery of the respective ports by the force of air moved toward the ports by the impeller to open the passageways between the housing and the balloon envelope and allow air to be forced into the balloon envelope.

6. The apparatus of claim 1, wherein the passive valve is an umbrella valve.

7. The apparatus of claim 1, wherein a first series of brackets are positioned on a bottom side of the plate and a second series of brackets are positioned on an exterior of the housing, and a line is threaded through the apertures in the first series of brackets and apertures in the second series of brackets and tightened to secure the housing to the plate.

8. The apparatus of claim 1, wherein the periphery of the passive valve has a round shape.

9. The apparatus of claim 1, wherein the housing has an end that downwardly tapers to its end such that air moved by the impeller is directed to the port.

10. The apparatus of claim 5, wherein there are three ports positioned in the center of the plate.

11. The apparatus of claim 1, wherein the periphery of the port is positioned within a recess within the plate and the periphery of the port is polished to provide an effective seal formed by the engagement of the periphery of the passive valve with the periphery of the port.

12. The apparatus of claim 1, further including:
an outlet port that provides a passageway from an inside of the balloon envelope to the atmosphere;
a first bracket extending from the bottom of the plate;
a first linear actuator having a first end and a second end, the first end of the linear actuator attached to the first bracket;
wherein a passive valve having a periphery is positioned over the outlet port;
wherein the second end of the linear actuator is attached to the passive valve;
wherein the passive valve is movable from a first, closed position where a seal is provided by the engagement of the periphery of the passive valve and a periphery of the outlet port to a second, open position where the periphery of the passive valve is disengaged from the periphery of the port by movement of the second end of the linear actuator to open the passageway between the inside of the balloon envelope and the atmosphere to allow air to be vented from the balloon envelope to the atmosphere.

13. The apparatus of claim 12, wherein the passive valve is attached to a cross member that is attached to the second end of the linear actuator.

14. The apparatus of claim 12, wherein a bladder is positioned within the balloon envelope, and the passageway allows air to move from the inside of the bladder to the atmosphere.

15. The apparatus of claim 13, wherein the outlet port includes a lip at the base of the outlet port and the ends or periphery of the cross member are engaged with the lip when the passive valve is in the first, closed position.

16. A balloon comprising:
a balloon envelope;
a bladder positioned within the balloon envelope;
a plate having a port;
a housing secured to the plate;
an impeller positioned within the housing;
wherein the port provides a passageway from an inside of the housing to an inside of the bladder within the balloon envelope;
wherein a passive valve having a periphery is positioned over the port;
a control system that is configured, upon receiving a signal to increase the amount of air within the bladder within the balloon envelope, to cause the impeller to operate to cause the passive valve to move from a first, closed position where a seal is provided by the engagement of the periphery of the passive valve and a periphery of the port to a second, open position where the periphery of the passive valve is disengaged from the periphery of the port by the force of air moved toward the port by the impeller to open the passageway between the housing and the bladder within the balloon envelope and to allow air to be forced into the bladder within the balloon envelope.

17. The balloon of claim 16, further including one or more additional ports that provide a passageway from the inside of the housing to the inside of the bladder within the balloon envelope;
wherein a passive valve having a periphery is positioned over each of the one or more additional ports;
wherein the passive valves positioned over the one or more additional ports are movable from a first, closed position where a seal is provided by the engagement of the periphery of the passive valves and a periphery of the respective ports to a second, open position where the periphery of the passive valves are disengaged from the periphery of the respective ports by the force of air moved toward the ports by the impeller to open the passageways between the housing and the bladder within balloon envelope and to allow air to be forced into the bladder within the balloon envelope.

18. The balloon of claim 16, wherein the passive valve is an umbrella valve.

19. The balloon of claim 16, further including:
an outlet port that provides a passageway from an inside of the bladder within the balloon envelope to the atmosphere;
a first bracket extending from the bottom of the plate;
a first linear actuator having a first end and a second end, the first end of the linear actuator attached to the first bracket;
wherein a passive valve having a periphery is positioned over the outlet port;
wherein the second end of the linear actuator is attached to the passive valve;
wherein the passive valve is movable from a first, closed position where a seal is provided by the engagement of the periphery of the passive valve and a periphery of the outlet port to a second, open position where the periphery of the passive valve is disengaged from the periphery of the port by movement of the second end of the linear actuator to open the passageway between the inside of the bladder within the balloon envelope and the atmosphere to allow air to be vented from the bladder within the balloon envelope to the atmosphere.

20. The balloon of claim 19, wherein the passive valve is attached to a cross member that is attached to the second end of the linear actuator.

21. The balloon of claim 19, wherein the outlet port includes a lip at the base of the outlet port and the ends or periphery of the cross member are engaged with the lip when the passive valve is in the first, closed position.

22. A computer-implemented method, comprising:
operating a control system for a balloon comprised of a balloon envelope, a bladder positioned within the balloon envelope, a plate having a port, a housing secured to the plate, an impeller positioned within the housing, where the port provides a passageway from an inside of the housing to an inside of the bladder, where a passive valve having a periphery is positioned over the port;
receiving a signal to increase the amount of air within the bladder within the balloon envelope; and
causing the impeller to operate, thereby causing the passive valve to move from a first, closed position where a seal is provided by the engagement of the periphery of the passive valve and a periphery of the port to a second, open position where the periphery of the passive valve is disengaged from the periphery of the port by the force of air moved toward the port by the impeller to open the passageway between the housing and the bladder within the balloon envelope and to allow air to be forced into the bladder within the balloon envelope.

23. The method of claim 22, further including:
operating a control system where the balloon further includes an outlet port that provides a passageway from an inside of the bladder within the balloon envelope to the atmosphere, a first bracket extending from the bottom of the plate, a first linear actuator having a first end and a second end, the first end of the linear actuator attached to the first bracket, wherein a passive valve having a periphery is positioned over the outlet port, wherein the second end of the linear actuator is attached to the passive valve, wherein the passive valve is movable from a first, closed position where a seal is provided by the engagement of the periphery of the passive valve and a periphery of the outlet port to a second, open position where the periphery of the passive valve is disengaged from the periphery of the port by movement of the second end of the linear actuator to open the passageway between the inside of the bladder within the balloon envelope and the atmosphere to allow air to be vented from the bladder within the balloon envelope to the atmosphere;
receiving a signal to decrease the amount of air within the bladder within the balloon envelope; and
causing the linear actuator to move the passive valve from a first, closed position where a seal is provided by the engagement of the periphery of the passive valve and a periphery of the outlet port to a second, open position where the periphery of the passive valve is disengaged from the periphery of the port by movement of the second end of the linear actuator to open the passageway between the inside of the bladder within the balloon envelope and the atmosphere to allow air to be vented from the bladder within the balloon envelope to the atmosphere.

24. A non-transitory computer readable medium having stored therein instructions executable by a computing device to cause the computing device to perform functions comprising:

operating a control system for a balloon comprised of a a balloon envelope, a bladder positioned within the balloon envelope, a plate having a port, a housing secured to the plate, an impeller positioned within the housing, where the port provides a passageway from an inside of the housing to an inside of the bladder, where a passive valve having a periphery is positioned over the port;

receiving a signal to increase the amount of air within the bladder within the balloon envelope; and causing the impeller to operate to force air towards the port, thereby causing the passive valve to move from a first, closed position where a seal is provided by the engagement of the periphery of the passive valve and a periphery of the port to a second, open position where the periphery of the passive valve is disengaged from the periphery of the port by the force of air moved toward the port by the impeller to open the passageway between the housing and the bladder within the balloon envelope and to allow air to be forced into the bladder within the balloon envelope.

25. The non-transitory computer readable medium of claim 24, further including instructions executable by the computing device to cause the computing device to perform functions comprising:

operating a control system where the balloon further includes an outlet port that provides a passageway from an inside of the bladder within the balloon envelope to the atmosphere, a first bracket extending from the bottom of the plate, a first linear actuator having a first end and a second end, the first end of the linear actuator attached to the first bracket, wherein a passive valve having a periphery is positioned over the outlet port, wherein the second end of the linear actuator is attached to the passive valve, wherein the passive valve is movable from a first, closed position where a seal is provided by the engagement of the periphery of the passive valve and a periphery of the outlet port to a second, open position where the periphery of the passive valve is disengaged from the periphery of the port by movement of the second end of the linear actuator to open the passageway between the inside of the bladder within the balloon envelope and the atmosphere to allow air to be vented from the bladder within the balloon envelope to the atmosphere;

receiving a signal to decrease the amount of air within the bladder within the balloon envelope; and causing the linear actuator to move the passive valve from a first, closed position where a seal is provided by the engagement of the periphery of the passive valve and a periphery of the outlet port to a second, open position where the periphery of the passive valve is disengaged from the periphery of the port by movement of the second end of the linear actuator to open the passageway between the inside of the bladder within the balloon envelope and the atmosphere to allow air to be vented from the bladder within the balloon envelope to the atmosphere.

* * * * *